(12) United States Patent
Shimazu et al.

(10) Patent No.: US 10,967,935 B2
(45) Date of Patent: Apr. 6, 2021

(54) CREATION DEVICE, COMPONENT CONTROL DEVICE, CREATION METHOD, COMPONENT CONTROL METHOD AND COMPUTER PROGRAM

(71) Applicant: Shimano Inc., Osaka (JP)

(72) Inventors: Hayato Shimazu, Osaka (JP); Hitoshi Takayama, Osaka (JP); Satoshi Shahana, Osaka (JP); Takafumi Nishino, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 98 days.

(21) Appl. No.: 16/453,561

(22) Filed: Jun. 26, 2019

(65) Prior Publication Data

US 2020/0010149 A1 Jan. 9, 2020

(30) Foreign Application Priority Data

Jul. 9, 2018 (JP) .............................. JP2018-130245

(51) Int. Cl.
*B62M 25/08* (2006.01)
*G06K 9/62* (2006.01)
*B62K 23/00* (2006.01)

(52) U.S. Cl.
CPC ............. *B62M 25/08* (2013.01); *B62K 23/00* (2013.01); *G06K 9/6227* (2013.01); *G06K 9/6255* (2013.01); *G06K 9/6259* (2013.01)

(58) Field of Classification Search
CPC ................... B62M 25/08; G06N 20/00; F16H 2061/0081; F16H 2061/0084; F16H 2061/0087; F16H 2061/0093
See application file for complete search history.

(56) References Cited

U.S. PATENT DOCUMENTS

| 6,047,230 | A | 4/2000 | Spencer et al. | |
|---|---|---|---|---|
| 6,714,849 | B1* | 3/2004 | Ferrero | B62M 25/08 |
| | | | | 280/261 |
| 2016/0009169 | A1* | 1/2016 | Biderman | B60L 3/0046 |
| | | | | 701/22 |
| 2016/0031527 | A1* | 2/2016 | Bortolozzo | B62M 9/123 |
| | | | | 701/58 |
| 2016/0364982 | A1* | 12/2016 | Hamlin | G08C 17/02 |
| 2017/0344123 | A1* | 11/2017 | Venkataraman | G06F 3/013 |
| 2018/0101775 | A1* | 4/2018 | Fish | G06Q 10/0631 |
| 2018/0365772 | A1* | 12/2018 | Thompson | G06Q 50/30 |

* cited by examiner

*Primary Examiner* — Edwin A Young
(74) *Attorney, Agent, or Firm* — Global IP Counselors, LLP

(57) ABSTRACT

A creation device includes an acquisition part that acquires input information concerning traveling of a human-powered vehicle; and a creation part that creates different learning models that each produce output information concerning control of a component of the human-powered vehicle based on input information acquired by the acquisition part.

30 Claims, 21 Drawing Sheets

| TIME INFORMATION | TRAVELING SPEED | CADENCE | TORQUE | YAW | | CONTROL DATA |
|---|---|---|---|---|---|---|
| 101 | 5.63 | 34 | 110 | 0.0001 | | 2 |
| 413 | 5.63 | 34 | 110 | 0.0000 | | 2 |
| 720 | 5.69 | 35 | 105 | 0.0000 | | 2 |
| 1028 | 5.78 | 35 | 100 | 0.0000 | | 2 |
| 1334 | 5.86 | 36 | 100 | 0.0001 | | 2 |
| 1645 | 5.89 | 34 | 125 | -0.0001 | | 3 |
| 1959 | 5.97 | 34 | 120 | 0.0000 | | 3 |
| ⋮ | ⋮ | ⋮ | ⋮ | ⋮ | | ⋮ |

FIG.9

CREATION DEVICE, COMPONENT CONTROL DEVICE, CREATION METHOD, COMPONENT CONTROL METHOD AND COMPUTER PROGRAM

CROSS-REFERENCE TO RELATED APPLICATIONS

This application claims priority to Japanese Patent Application No. 2018-130245, filed on Jul. 9, 2018. The entire disclosure of Japanese Patent Application No. 2018-130245 is hereby incorporated herein by reference.

BACKGROUND

Technical Field

The present invention generally relates to a creation device for creating data concerning control of the components of a human-powered vehicle, a component control device, a creation method, a component control method and a computer program.

Background Information

Human-powered vehicles at least partially utilizing man power have been known, including a bicycle, a power-assisted bicycle, an electric bicycle called an e-bike and so on. The human-powered vehicle is provided with a multi-geared transmission device that shifts gears according to a gear shifting operation by a rider. An automatic gear shifting control system has conventionally been proposed for automatically controlling a gear shift by using sensors such as a speed sensor, a cadence sensor, a chain tension sensor and so on, and performing various computations on an output from each of the sensors (e.g., see U.S. Pat. No. 6,047,230—Patent Document 1).

SUMMARY

An automatic control aims at producing a control that closely matches a rider's intention. The automatic control of components, including the transmission device disclosed in Patent Document 1 or the like, is achieved by combinations of determinations as to whether or not each of the numerical values obtained from the various sensors such as a speed sensor, a torque sensor and so on mounted on the human-powered vehicle is larger than a predetermined threshold. However, the determination using a threshold is insufficient for achieving desired automatic gear shifting control.

Even if the same user rides the same human-powered vehicle, the details of component control are different depending on situations as to whether the traveling purpose is for moving or racing and so on, and traveling environments.

An object of the present disclosure is to provide a control data creation device, a component control device, a creation method, a component control method and a computer program that achieve automatic control of components that is less likely to make the rider feel uncomfortable even in the various situations or the traveling environments.

A creation device according to a first aspect of the present disclosure comprises at least one processor configured to execute operations including an acquisition part and a creation part. The acquisition part is configured to acquire input information concerning traveling of a human-powered vehicle. The creation part is configured to use the learning algorithm to create different learning models that each produce output information concerning control of a component of the human-powered vehicle based on the input information acquired by the acquisition part.

Thus, automatic control of the components that is less likely to make the rider feel uncomfortable can be achieved by different learning models so as to be suited to various situations or traveling environments.

In a creation device according to a second aspect of the present disclosure, the creation device according to the above-described first aspect is configured such that the output information includes at least one of a gear stage and a gear ratio for a transmission.

Thus, automatic control of gear shift that is less likely to make the rider feel uncomfortable can be achieved so as to be suited to various situations or traveling environments.

In a creation device according to the third aspect of the present disclosure, the creation device according to the above-described first or the second aspect is configured such that the input information includes at least one of a traveling speed of the human-powered vehicle and a cadence of a crank of a driving mechanism.

Thus, automatic control that is less likely to make the rider feel uncomfortable can be achieved so as to be suited to various situations or traveling environments.

In a creation device according to a fourth aspect of the present disclosure, the creation device according to any one of the above-described first to third aspects is configured such that the input information includes detection data of an attitude of the human-powered vehicle.

Thus, automatic control that is less likely to make the rider feel uncomfortable can be achieved so as to be suited to various situations or traveling environments.

In a creation device according to a fifth aspect of the present disclosure, the creation device according to any one of the above-described first to fourth aspects is configured such that the input information includes detection data of a posture of a user riding the human-powered vehicle.

Thus, automatic control that is less likely to make the rider feel uncomfortable can be achieved so as to be suited to various situations or traveling environments.

In a creation device according to a sixth aspect of the present disclosure, the creation device according to any one of the above-described first to fifth aspects is configured such that the input information includes detection data of a traveling environment of the human-powered vehicle.

Thus, automatic control that is less likely to make the rider feel uncomfortable can be achieved so as to be suited to various situations or traveling environments.

In a creation device according to a seventh aspect of the present disclosure, the creation device according to any one of the above-described first to sixth aspects is configured such that the creation part is configured to input pieces of the input information in different combination from a combination of information for another one of the learning models out of the pieces of the input information acquired by the acquisition part for each of the different learning models.

Thus, automatic control that is less likely to make the rider feel uncomfortable can be achieved so as to be suited to various situations or traveling environments.

In a creation device according to an eighth aspect of the present disclosure, the creation device according to any one of the above-described first to seventh aspects is configured such that the creation part is configured to set pieces of the input information in a different combination for each of the different learning models.

Thus, automatic control that is adapted to user's preferences can be achieved so as to be suited to various situations or traveling environments.

In a creation device according to a ninth aspect of the present disclosure, the creation device according to any one of the above-described first to eighth aspects is configured such that the creation part is configured to assign weights different from those of another one of the learning models to a plurality of pieces of data included in the input information acquired by the acquisition part for each of the different learning models, and inputs the plurality of pieces of the data that have been weighted.

Thus, automatic control that is less likely to make the rider feel uncomfortable can be achieved so as to be suited to various situations or traveling environments.

In a creation device according to a tenth aspect of the present disclosure, the creation device according to any one of the above-described first to ninth aspects is configured such that the creation part is configured to set different weights for each of the different learning models.

Thus, automatic control that is adapted to rider's preferences can be achieved so as to be suited to various situations or traveling environments.

In a creation device according to an eleventh aspect of the present disclosure, the creation device according to any one of the above-described first to tenth aspects is configured such that the acquisition part is configured to acquire pieces of the input information at different points in time, and the creation part is configured to input the pieces of the input information at the different points in time to each of the learning models.

Hence, the learning model that outputs output information concerning control based on the pieces of input information obtained at different points in time is created so as to be suited to the various situations and traveling environments, which enables achievement of automatic control that is unlikely to produce discomfort.

In a creation device according to a twelfth aspect of the present disclosure, the creation device according to the above-described eleventh aspect is configured such that an interval between the points in time when the pieces of input information are acquired is different among the different learning models.

Hence, the learning model that outputs output information concerning control based on the pieces of input information obtained at different points in time is created so as to be suited to the various situations and traveling environments, which enables achievement of automatic control that is unlikely to produce discomfort.

In a creation device according to a thirteenth aspect of the present disclosure, the creation device according to any one of the above-described first to tenth aspects is configured such that the acquisition part is configured to acquire pieces of the input information at different points in time, and the creation part is configured to input a variation between the pieces of the input information to the learning model.

Hence, the learning model that outputs output information concerning control based on the variation between the input information obtained over multiple points in time is created so as to be suited to the various situations and traveling environments, which enables achievement of automatic control that is unlikely to produce discomfort.

In a creation device according to a fourteenth aspect of the present disclosure, the creation device according to the above-described thirteenth aspect is configured such that a time duration corresponding to the variation between the pieces of the input information is different among the different learning models.

Hence, the learning model that outputs output information concerning control based on the input information obtained over multiple points in time is created so as to be suited to the various situations and traveling environments, which enables achievement of automatic control that is unlikely to produce discomfort.

In a creation device according to a fifteenth aspect of the present disclosure, the creation device according to any one of the above-described first to fourteenth aspects further comprises a selection input that selects a targeted learning model out of the different learning models, and the creation part creates a targeted learning model selected by the selection input.

Thus, automatic control that is less likely to make the rider feel uncomfortable can be achieved so as to be suited to various situations or traveling environments.

In a creation device according to a sixteenth aspect of the present disclosure, the creation device according to the above-described fifteenth aspect is configured such that the at least one processor further includes an evaluation part configured to evaluate the output information output from a targeted learning model selected by the selection input, and the creation part is configured to update the targeted learning model based on an evaluation by the evaluation part.

Thus, automatic control that is less likely to make the rider feel uncomfortable can be achieved so as to be suited to various situations or traveling environments.

in a creation device according to a seventeenth aspect of the present disclosure, the creation device according to the above-described sixteenth aspect further comprises a user operable input device configured to accept a designation operation concerning the output information, and the evaluation part being configured to make an evaluation by checking output information output from the targeted learning model in response to an input of the input information acquired by the acquisition part to the targeted learning model against designation operation accepted by the user operable input device.

Thus, automatic control that is less likely to make the rider feel uncomfortable can be achieved so as to be suited to various situations or traveling environments.

In a creation device according to an eighteenth aspect of the present disclosure, the creation device according to the above-described seventeenth aspect is configured such that the evaluation part is configured to provide the output information with a low evaluation concerning the targeted learning model upon determining the output information output from the targeted learning model and a detail of the designation operation do not much with each other.

This makes it possible to achieve automatic control adapted to rider's operation.

In a creation device according to a nineteenth aspect of the present disclosure, the creation device according to the above-described seventeenth aspect is configured such that the creation part is configured to update the targeted learning model by assigning a weight based on training data including the detail of the designation operation upon determining the output information output from the targeted learning model and a detail of the designation operation do not much with each other.

This makes it possible to achieve automatic control adapted to rider's operation.

In a creation device according to a twentieth aspect of the present disclosure, the creation device according to the above-described seventeenth aspect further comprises a non-transitory computer readable storage that temporarily stores, one by one, a plurality of pieces of input information in time series for access by the acquisition part, and the creation part being configured to set, upon acceptance of the designation operation by the user operable input device, the pieces of the input information acquired before and after a timing when the designation operation is performed as input data, and the creation part being configured to update the targeted learning model using the input data and a detail of the operation by the user operable input device.

Thus, automatic control that is less likely to make the rider feel uncomfortable can be achieved according to changes so as to be suited to various situations or traveling environments.

In a creation device according to the twenty-first aspect of the present disclosure, the creation device according to the above-described twentieth aspect. is configured such that the creation part is configured to update the targeted learning model by increasing the number of acquisitions of input information upon acceptance of the designation operation by the user operable input device Hence, if the output of the learning model and the operation by the rider do not match with each other, intensive learning is made to thereby achieve automatic control that is unlikely to produce discomfort.

In a creation device according to the twenty-second aspect of the present disclosure, the creation device according to the above-described twentieth aspect is configured such that the creation part is configured to update the targeted learning model by increasing an acquisition frequency of input information upon acceptance of the designation operation by the user operable input device.

Hence, if the output of the learning model and the operation by the rider do not match with each other, intensive learning is made to thereby achieve automatic control that is unlikely to produce discomfort.

In a creation device according to the twenty-third aspect of the present disclosure, the creation device according to the above-described sixteenth aspect further comprised an evaluation acceptance part configured to accept an evaluation provided by the user for action of the component based on the output information output from each of the different learning models, and the targeted learning model being updated based on training data including a detail of the evaluation accepted by the evaluation acceptance part, the output information output from the targeted learning model at a timing upon acceptance of the evaluation is accepted, and the input information in association with the output information.

This makes it possible to achieve automatic control adapted to the preferences of the rider.

In a creation device according to the twenty-fourth aspect of the present disclosure, the creation device according to the above-described twenty-third aspect further comprises an user operable input device configured to accept a designation operation concerning the output information, and the evaluation acceptance part being provided at the operation input device or near the operation input device so as to accept evaluation operation by the user.

This makes it possible to achieve automatic control adapted to the preferences of the rider.

In a creation device according to the twenty-fifth aspect of the present disclosure, the creation device according to the above-described twenty-third aspect is configured such that the evaluation acceptance part includes a specification part that specifies facial expressions from a photographed image obtained by photographing a face of the user who is riding the human-powered vehicle, and that accepts an evaluation made by the user based on the facial expressions specified by the specification part.

This makes it possible to achieve automatic control adapted to the preferences of the rider.

In a creation device according to the twenty-sixth aspect of the present disclosure, the creation device according to the above-described twenty-third aspect is configured such that the evaluation acceptance part includes a voice recognition part, and accepts an evaluation by recognizing a voice of the user.

This makes it possible to achieve automatic control adapted to the preferences of the rider.

In a creation device according to the twenty-seventh aspect of the present disclosure, the creation device according to the above-described first to twenty-sixth aspects further comprises a model selection input configured to accept a selection of any one of the different learning models that have been created and a transmission part configured to transmit the one of the different learning models selected by the model selection input.

Thus, automatic control that is less likely to make the rider feel uncomfortable can be achieved so as to be suited to various situations or traveling environments.

A component control device according to the twenty-eighth aspect of the present disclosure comprises a model selection input, a non-transitory computer readable storage and at least one processor. The non-transitory computer readable storage has a learning algorithm stored in the non-transitory computer readable storage. The at least one processor is operatively coupled to the non-transitory computer readable storage to execute operations including an acquisition part, a creation part and a control part. The acquisition part is configured to acquire input information concerning traveling of the human-powered vehicle. The creation part is configured to use the learning algorithm to create different learning models for outputting output information concerning control of a component of a human-powered vehicle based on input information concerning traveling of the human-powered vehicle. The control part is configured to control the component based on the output information output from a selected one of the different learning models by inputting the input information acquired by the acquisition part to the selected one of the learning models.

Thus, component control depending on the situations where determination using a threshold is insufficient, based on multiple pieces of input information including the measured values concerning traveling can be achieved so as to be suited to various situations or traveling environments.

In a component control device according to the twenty-ninth aspect of the present disclosure, the component control device according to the above-described twenty-eighth aspect is configured such that the acquisition part is configured to acquire the input information that is brought into correspondence with the selected one of the learning models selected by the model selection input and inputs the input information.

Thus, automatic control that is less likely to make the rider feel uncomfortable can be achieved so as to be suited to various situations or traveling environments.

In a component control device according to the thirtieth aspect of the present disclosure, the component control device according to the above-described twenty-ninth aspect is configured such that the output information includes at least one of a gear stage and a gear ratio for a transmission in the component control device according to the above-described twenty-ninth aspect.

Thus, automatic control of gear shift that is less likely to make the rider feel uncomfortable can be achieved so as to be suited to various situations or traveling environments.

A creation method according to the thirty-first aspect of the present disclosure comprises acquiring input information concerning traveling of a human-powered vehicle; and creating by a learning algorithm different learning models that each produce output information concerning control of a component of the human-powered vehicle based on acquired input information.

Thus, component control depending on the situations where determination using a threshold is insufficient, based on multiple pieces of input information including the measured values concerning traveling can be achieved so as to be suited to various situations or traveling environments.

A component control method according to the thirty-second aspect of the present disclosure comprises acquiring input information concerning traveling of a human-powered vehicle; accepting selection of any one of different learning models each created using a learning algorithm such that output information concerning control of a component of the human-powered vehicle is output based on the input information; specifying output information to be output from a selected one of the learning models by inputting the acquired input information to the selected one of the learning models; and controlling the component based on the specified output information.

Thus, component control depending on the situations where determination using a threshold is insufficient, based on multiple pieces of input information including the measured values concerning traveling can be achieved so as to be suited to various situations or traveling environments.

A computer program product according to the thirty-third aspect of the present disclosure is disposed upon a non-transitory computer readable storage medium. The computer program product comprises computer program instructions that, when executed by a computer, cause the computer to execute processing of acquiring input information concerning traveling of a human-powered vehicle; and creating by a learning algorithm different learning models that each produce output information concerning control of a component of the human-powered vehicle based on acquired input information.

Thus, component control depending on the situations where determination using a threshold is insufficient, based on multiple pieces of input information including the measured values concerning traveling can be achieved so as to be suited to various situations or traveling environments.

According to the a creation device for creating data concerning control of the components of a human-powered vehicle, a component control device, a creation method, a component control method and a computer program, automatic control of the components that is less likely to make the rider feel uncomfortable even in the various situations or the traveling environments can be achieved.

BRIEF DESCRIPTION OF THE DRAWINGS

Referring now to the attached drawings which form a part of this original disclosure.

FIG. 9 is one example of the contents of input information stored in a storage of the controller and the outline of training.

DETAILED DESCRIPTION OF EMBODIMENT

The descriptions of the embodiments below are examples of forms that a creation device and a component control device according to the present invention can take, though there is no intention to limit the forms. The creation device, the component control device, a creation method, a component control method, a computer program and a learning model according to the present invention can take forms different from the embodiments, such as forms of modification of each of the embodiments and a combination of at least two modifications that do not contradict each other. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

In the following description of each of the embodiments, the terms indicating directions, such as front, rear, forward, backward, left, right, sideways, upper, lower and so on are used with reference to the directions seen as the user sits in the saddle of a human-powered vehicle.

First Embodiment

Figure 1:
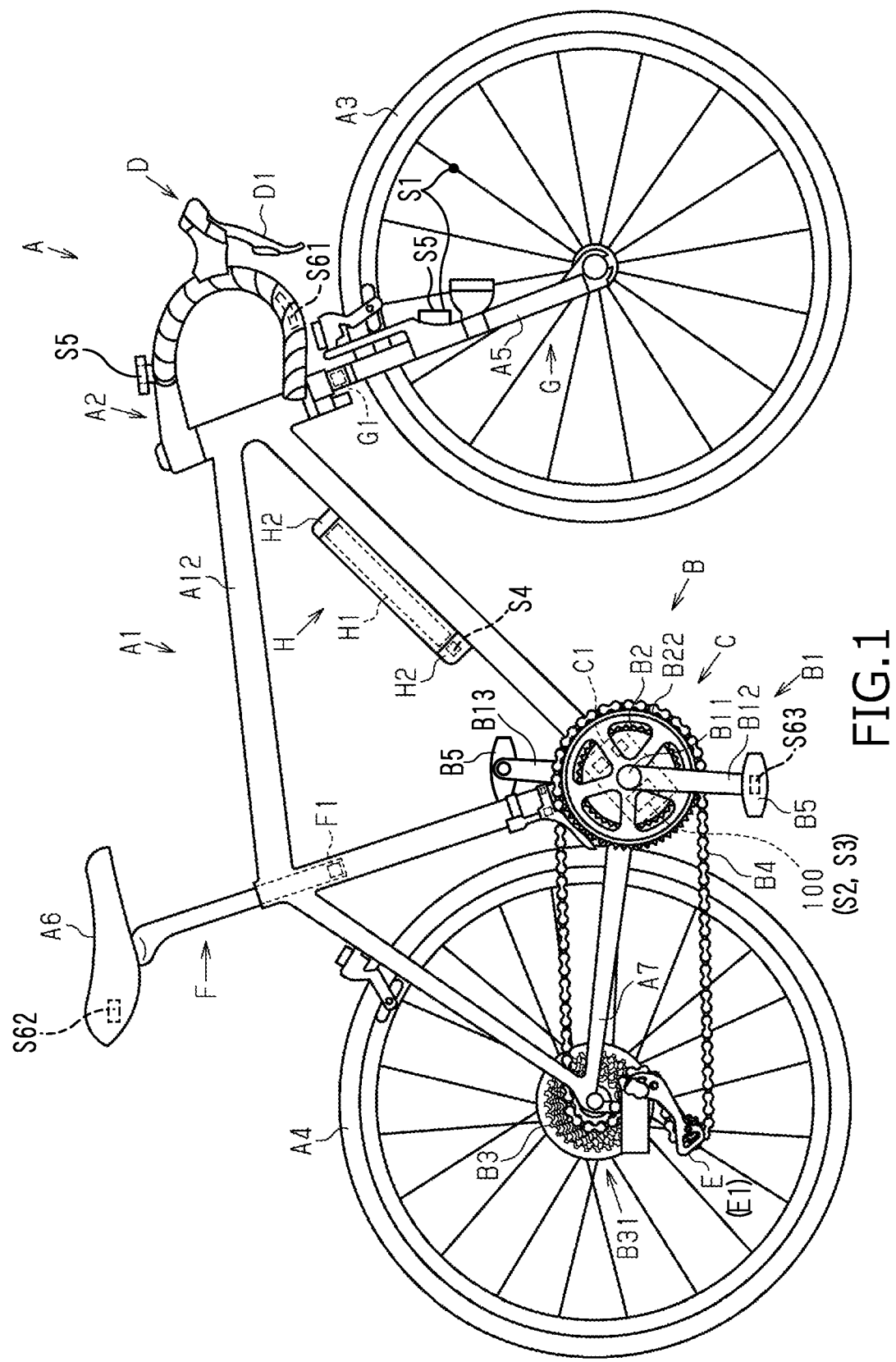
FIG. 1 is a side elevational view of a bicycle to which creation devices or component control devices are applied according to first to fourth embodiments.

FIG. 1 is a side view of a human-powered vehicle A to which a creation device 1 according to the first embodiment is applied. The human-powered vehicle A is a road bike including an assist mechanism C that assists in the propulsion of the human-powered vehicle A using electric energy. The configuration of the human-powered vehicle A can arbitrarily be changed. In the first example, the human-powered vehicle A does not include the assist mechanism C. In the second example, the kind of the human-powered vehicle A is a utility bicycle, a mountain bicycle or a hybrid bicycle. In the third example, the human-powered vehicle A includes the features of the first example and the second example.

The human-powered vehicle A is provided with a main body A1, a handlebar A2, a front wheel A3, a rear wheel A4, a front fork A5, a saddle A6 and a derailleur hanger A7. The human-powered vehicle A includes a driving mechanism B, an assist mechanism C, a plurality of user operable input devices D (only one shown in FIG. 1), a transmission E, an electric seat post F, an electric suspension G, a battery unit H and a controller 100. The human-powered vehicle A includes a speed sensor S1, a cadence sensor S2, a torque sensor S3, a gyro sensor S4, an image sensor S5 and posture sensors S61, S62 and S63. The main body A1 is provided with a frame A12.

The driving mechanism B transmits a human-powered drive force to the rear wheel A4 by a chain drive, a belt drive or a shaft drive. FIG. 1 illustrates the driving mechanism B of the chain drive. The driving mechanism B includes a crank B1, a first sprocket assembly B2, a second sprocket assembly B3, a chain B4 and a pair of pedals B5.

The crank B1 includes a crank shaft B11, a right crank B12 and a left crank B13. The crank shaft B11 is rotatably supported to the assist mechanism C mounted on the frame A12. The right crank B12 and the left crank B13 are respectively coupled to the crank shaft B11. One of the pair of pedals B5 is rotatably supported to the right crank B12. The other of the pair of pedals B5 is rotatably supported to the left crank B13.

The first sprocket assembly B2 has a first rotative central axis and is coupled to the crank shaft B11 so as to allow for unitary rotation. The first sprocket assembly B2 includes one or more sprockets B22. The crank shaft B11 and the first sprocket assembly B2 are coaxial with each other. As one example, the first sprocket assembly B2 includes multiple sprockets B22 different in outer diameters. As one example, the multiple sprockets B22 are made larger in outer diameter and larger in the number of gear stages as they are outwardly away from the main body A1.

The second sprocket assembly B3 has a second rotative central axis and is rotatably supported to a hub (not illustrated) of the rear wheel A4. The second sprocket assembly B3 includes one or more sprockets B31. As one example, the second sprocket assembly B3 includes multiple sprockets B31 different in outer diameters. As one example, the multiple sprockets B31 are made smaller in outer diameter and larger in the number of gear stages as they are outwardly away from the rear wheel A4.

The chain B4 is entrained about any one of the sprockets B22 of the first sprocket assembly B2 and any one of the sprockets B31 of the second sprocket assembly B3. When the crank B1 rotates forwardly by a human-powered drive force applied to the pair of pedals B5, the first sprocket assembly B2 rotates forwardly together with the crank B1, which transmits the rotation of the first sprocket assembly B2 to the second sprocket assembly B3 via the chain B4 to thereby rotate forwardly the rear wheel A4.

The assist mechanism C includes an electric actuator C1. The assist mechanism C assists the propulsion of the human-powered vehicle A. As one example, the assist mechanism C transmits a torque to the first sprocket assembly B2 to thereby assist the propulsion of the human-powered vehicle A. The electric actuator C1 includes an electric motor, for example. The electric actuator C1 can include a reducer. The electric actuator C1 includes the chain B4 that runs for transmitting a driving force to the rear wheel A4 of the human-powered vehicle A. The assist mechanism C is a part of the components that can be controlled by a signal for assisting the running of the chain B4.

Each of the user operable input devices D includes a user operated part D1 to be operated by the user. The user operable input device D is not limited to the one illustrated FIG. 1, and can include, for example, a button, a switch, a lever, a dial and/or a touch screen. One example of the user operated part D1 is one or more buttons for operating the electric seat post F and the electric suspension G. Another example of the user operated part D1 is a dual brake-shift lever as shown in FIG. 1 for operating a brake device and the transmission E. The dual brake-shift levers are provided at left and right ends of the handlebar A2. The dual brake-shift levers are moved to be inclined sideways, such that a gear stage or a gear ratio for the transmission E can be changed. In addition, the user operable input devices D accept a designation operation concerning control of various components such as mode switching of the assist mechanism C (power-saving mode, high-power mode, etc.), operation switching of the electric seat post F, operation switching of the electric suspension G and so on. The user operable input devices D are connected to communicate with each of the components so as to transmit a signal responsive to an operation performed by the user operated part D1 to the transmission E or the other components. In the first example, one of the user operable input devices D is connected to communicate with the transmission E through a communication line or an electric wire that allows for power line communication (PLC). In the second example, one of the user operable input devices D is connected to communicate with the transmission E and the other components by a wireless communication unit that allows for wireless communication. In the case where the user operated part D1 is operated, a control signal for shifting the gear stage of the transmission E is transmitted to the transmission E, and in response to the signal, the transmission E operates to shift the gear stage, in the first example. The control signal includes, for example, an INWARD signal indicating a shift to the inner sprocket B31 and an OUTWARD signal indicating a shift to the external sprocket B31. Each of the signals can include the number of gear stages of the sprocket B31 to be shifted. Shifting of two stages or more at a time can also be possible.

The transmission E can take various forms. In the first example, the transmission E is an external transmission for shifting a coupled state between the second sprocket assembly B3 and the chain B4. Specifically, by shifting the sprocket B31 to be coupled to the chain B4, the transmission E changes a ratio of the number of rotations of the rear wheel A4 to the number of rotations of the crank B1, that is, the gear ratio of the human-powered vehicle A. The transmission E activates the electric actuator E1 for moving the chain B4 according to the selected gear stage to thereby change the gear ratio. More specifically, the transmission E in the first example is attached to the derailleur hanger A7 of the human-powered vehicle A. In the second example, the transmission E is an external transmission for shifting a coupled state between the first sprocket assembly B2 and the chain B4. Specifically, by shifting the sprocket B22 to be coupled to the chain B4, the transmission E changes a ratio of the number of rotations of the rear wheel A4 to the number of rotations of the crank B1, that is, the gear ratio of the human-powered vehicle A. In the third example, the transmission E is an internal transmission. In the third example, the movable part of the transmission E includes at least one of a sleeve and a claw of the internal transmission. In the fourth example, the transmission E is a continuously variable transmission. In the fourth example, the movable part of the transmission E includes a ball planetary of the continuously variable transmission. The transmission E is a part of the components that can be controlled by a signal for shifting a gear stage.

The electric seat post F is attached to the frame A12. The electric seat post F includes an electric actuator F1. The electric actuator F1 causes the saddle A6 to rise or fall relative to the frame A12. The electric actuator F1 is an electric motor, for example. The electric seat post F is a part of the components that can be controlled by setting a supported position of the saddle A6 relative to the frame A12 as an operation parameter. The saddle A6 can be supported at one or more supported positions.

The electric suspension G can take various forms. In the first embodiment, the electric suspension G, which is provided at the front fork A5, is a front suspension for damping the shock applied to the front wheel A3. The electric suspension G includes an electric actuator G1. The electric actuator G1 is an electric motor, for example. The electric suspension G is a part of the components that can be controlled by setting a damping factor, a stroke amount and a locked out state as operation parameters. The electric suspension G can change the operation parameters by driving the electric actuator G1. The electric suspension G can be a rear suspension for damping the shock applied to the rear wheel A4.

The battery unit H includes a battery H1 and a battery holder H2. The battery H1 is a rechargeable battery including one or more battery cells. The battery holder H2 is fixed at the frame A12 of the human-powered vehicle A. The battery H1 can be attached to and detached from the battery holder H2. When attached to the battery holder H2, the battery H1 is electrically connected to at least the electric actuator E1 of the transmission E, the electric actuator C1 of the assist mechanism C and the controller 100. The battery H1 can also be electrically connected to the electric actuator F1 of the electric seat post F and the electric actuator G1 of the electric suspension G.

The speed sensor S1 is fixed at the frame A12. The speed sensor S1 is a sensor for outputting a signal indicating the traveling speed of the human-powered vehicle A. The speed sensor S1, which includes a magnet provided at the front wheel A3 and a main body provided at the front fork A5 for detecting the magnet, for example, measures a rotation speed.

The cadence sensor S2 is provided so as to measure a cadence of any one of the right crank B12 and the left crank B13. The cadence sensor S2 outputs a signal indicating the measured cadence. The torque sensor S3 is provided so as to respectively measure torques applied to the right crank B12 and the left crank B13. The torque sensor S3 outputs a signal indicating the torque measured at least one of the right crank B12 and the left crank B13.

The gyro sensor S4 is fixed at the frame A12. The gyro sensor S4 is a sensor for outputting signals respectively indicating yaw, roll and pitch of the human-powered vehicle A. The gyro sensor S4 can output a signal indicating at least any one of the three axes, not limited to all the three axes.

The image sensor S5 is provided on the frame A12 so as to face the front. In the first example, the image sensor S5 is mounted on the front fork A5 together with a light so as to face the front. In the second example, it is mounted on the handlebar A2. The image sensor S5 outputs a video corresponding to the user's field of vision by using a camera module. The image sensor S5 outputs a video signal obtained by photographing an object present in the direction of travel. The image sensor S5 can be a module that is integrally equipped with an image recognition unit for performing recognition processing of separately recognizing a road, a building and another traveling vehicle from the video and that outputs a recognition result.

The posture sensors S61, S62 and S63 are piezoelectric sensors, for example. The posture sensors S61, S62 and S63 are respectively provided at portions of the human-powered vehicle A where the weights of the user are applied. The posture sensors S61 are provided at both of the handles, for example. The posture sensors S62 are provided at one or more positions of the saddle A6 along the surface thereof. The posture sensors S63 are provided at both of the pair of pedals B5 of the crank B1. The posture sensors S61, S62 and S63 each output a signal responsive to the applied weight. In place of the posture sensors S61, S62 and S63 or in addition thereto, a gyro sensor can be attached to the helmet in order to detect the posture of the user.

Figure 2:
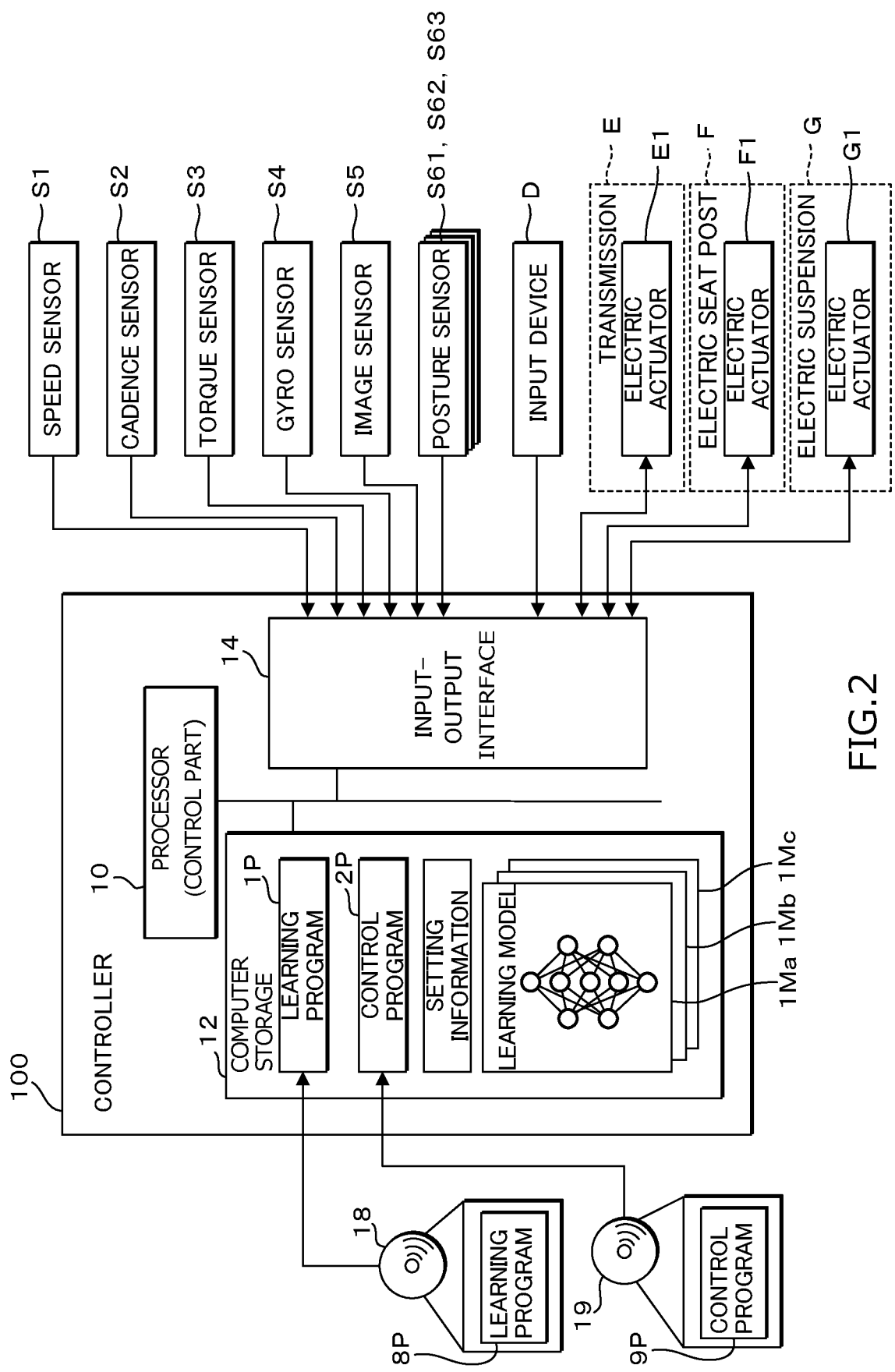
FIG. 2 is a block diagram schematically illustrating a bicycle component control system including a controller, a plurality of sensors, a user operable input device and a plurality of bicycle components.

FIG. 2 is a block diagram illustrating the internal configuration of the controller 100. The controller 100 is preferably an electronic controller or a microcomputer that includes one or more processors and one or more computer storage devices (i.e., computer memory devices). The controller 100 is formed of one or more semiconductor chips that are mounted on a printed circuit board. The terms "controller" and "electronic controller" as used herein refer to hardware that executes a software program, and does not include a human. The controller 100 includes a processor 10, a storage 12 and an input-output interface 14. The controller 100 is provided at any position of the frame A12. In the first example as illustrated in FIG. 1, the controller 100 is provided between the first sprocket assembly B2 and the frame A12. In the second example, the controller 100 is provided in the battery holder H2.

The processor 10 is a computer processor utilizing a central processing unit (CPU) or a graphics processing unit (GPU), and executes processing by controlling a learning algorithm that will be described later and the components mounted on the human-powered vehicle A using a memory such as a built-in read only memory (ROM), a random access memory (RAM) and so on. The processor 10 acquires time information at an arbitrary timing by using an internal clock.

The storage 12 is any computer storage device or any non-transitory computer-readable medium with the sole exception of a transitory, propagating signal. In other words, the term "storage" as used herein refers to a non-transitory computer readable storage. The storage 12 includes a non-volatile memory such as a flash memory, a hard disk, a ROM (Read Only Memory) device, and so on, for example. Also, for example, the storage 12 can also include volatile memory such as a RAM (Random Access Memory) device. The storage 12 stores a learning program 1P and a control program 2P. The learning program 1P can be included in the control program 2P. The learning program 1P can be obtained by reading out a learning program 8P stored in a recording medium 18 and copying it in the storage 12. The control program 2P can be obtained by reading out a control program 9P stored in a storage medium 19 and copying it in the storage 12.

The storage 12 stores multiple different learning models 1Ma, 1Mb, ... created by the processing performed by the processor 10. The storage 12 stores correspondences between the different learning models 1Ma, 1Mb, ... and different modes that will be described later. The storage 12 stores for each of the different learning models 1Ma, 1Mb, ... or for each of the modes setting information including settings as to which pieces of input information from the sensor groups S1-S5 and S61-S63 mounted on the human-powered vehicle A is to be combined and set as input information, and which information is to be weighted. The setting included in the setting information can be the same or different among the different learning models 1Ma, 1Mb, ... or among the different modes. The processor 10 accepts for each of the different learning models 1Ma, 1Mb, ... setting of a different combination of input information in setting information and stores the setting information based on the accepted setting. The processor 10 similarly accepts for each of the different learning models 1Ma, 1Mb, ... settings of weights to be assigned to multiple pieces of data included in each piece of input information in the setting information and stores the setting information based on the accepted setting. The setting can be accepted in advance or accepted at an arbitrary timing.

The input-output interface 14 is connected to at least sensor groups S1-S5 and S61-S63, the user operable input devices D and the electric actuator E1 to be controlled that are mounted on the human-powered vehicle A. The input-output interface 14 is also connected to the electric actuators F1 and G1 to be controlled. The processor 10 receives an input of a signal indicative of speed or a cadence from any one of the speed sensor S1 or the cadence sensor S2 through the input-output interface 14. The processor 10 receives an input of a signal indicative of an attitude of the human-powered vehicle A, specifically, a signal indicative of yaw, roll or pitch from the gyro sensor S4. The processor 10 receives an input of a signal indicative of a posture of the user, specifically, a signal indicative of weight distribution from each of the posture sensors S61, S62 and S63. The processor 10 performs processing utilizing the information acquired from these sensor groups S1-S5 and S61-S63 as input information. The processor 10 receives a signal from the user operable input devices D through the input-output interface 14. In the block diagram illustrated in FIG. 2, the input-output interface 14 is connected to the electric actuator F1 and the electric actuator G1, though it does not need to be connected to the electric actuator F1 and the electric actuator G1 if these actuators F1 and G1 are not to be controlled.

The controller 100 operates in a learning mode and an automatic control mode. The controller 100 operates in further different modes in each of the learning mode and the automatic control mode. The different modes include a "race mode," a "city mode" and a "mountain mode" in the first example. The different modes include a "power mode," a "normal mode" and an "eco mode" in the second example. The different modes are merely classified into a "first mode" and a "second mode" without purpose in the third example. The user operable input device D is provided with a mode selection button D2 for accepting a mode selection for each type of the human-powered vehicle A. The user operable input device D stores information indicating which mode is selected by the mode selection button D2 in the integrated memory. The processor 10 can refer to the information indicating the selected mode of the mode selection button D2 through the user operable input device D from the memory. The mode selection button D2 corresponds to a "selection input" of a "creation device" or a "model selection input" of a "component control device."

If operating in the learning mode, then the processor 10 creates different learning models 1Ma, 1Mb, ... corresponding to different modes based on the learning program 1P by a learning algorithm of the deep learning. In the learning mode, the controller 100 corresponds to the "creation device." If operating in the automatic control mode, then the processor 10 functions as a model selection input that accepts selection of any one of the different learning models 1Ma, 1Mb, ... by selecting any one of the different modes based on the control program 2P. The processor 10 functions as a control part that controls components including the transmission E based on output information output from a selected one of the learning models 1Ma, 1Mb, ... by inputting the input information acquired from the input-output interface 14 to the selected one of the learning models 1Ma, 1Mb, ..... In the automatic control mode, the controller 100 corresponds to the "component control device."

Figure 3:
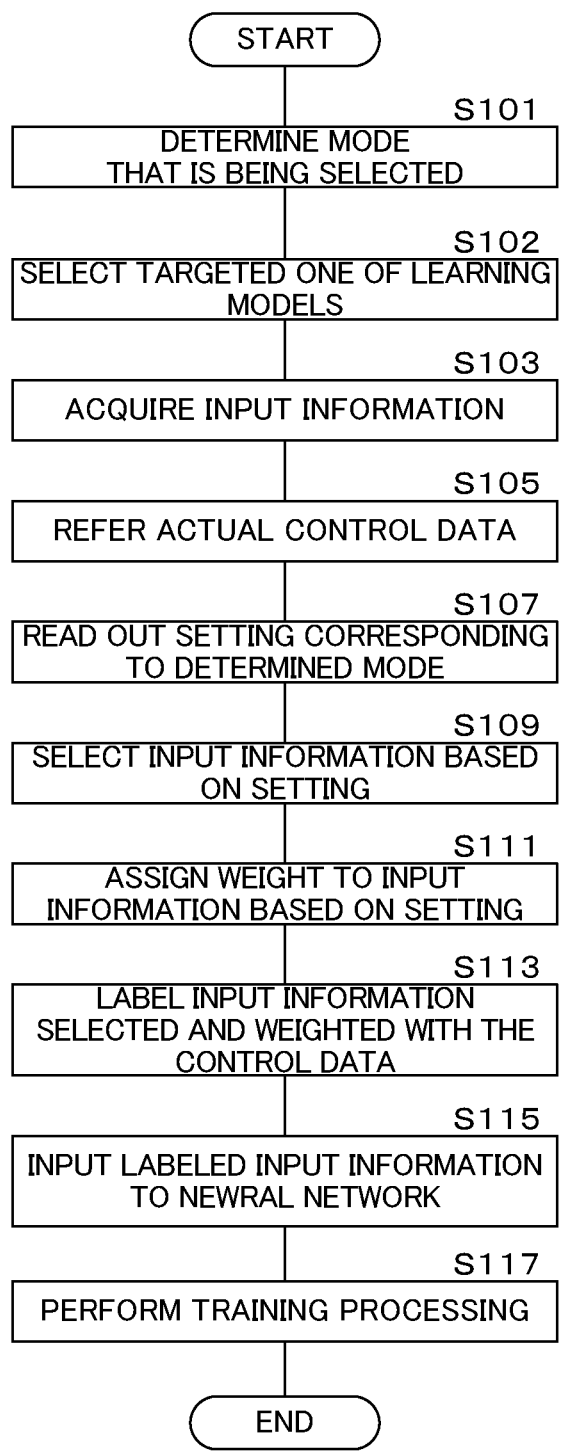
FIG. 3 is a flowchart depicting one example of a processing procedure in a learning mode performed by a processor of the controller.

First, the operation of the controller 100 in the learning mode will be described. FIG. 3 is a flowchart depicting one example of a processing procedure in the learning mode performed by the processor 10. The learning algorithm in the present embodiment is supervised deep learning using a neural network (hereinafter referred to as NN). The learning algorithm can be an unsupervised learning algorithm, or can be a recurrent neural network. The learning algorithm can be for reinforcement learning. The processor 10 repeatedly executes the processing procedure in the flowchart illustrated in FIG. 3 during the learning mode every predetermined sampling period (30 milliseconds, for example) for every component to be controlled.

The processor 10 determines the mode that is being selected by the user operable input device D out of the different modes (step S101). At step S101, the processor 10 can determine which mode is being selected via the user operable input device D as described above. The processor 10 selects a targeted one of the learning models 1Ma, 1Mb, . . . corresponding to the determined mode out of the different learning models 1Ma, 1Mb, . . . (step S102).

The processor 10 acquires input information concerning traveling of the human-powered vehicle A by the input-output interface 14 (step S103). At step S103, the processor 10 corresponds to an "acquisition part." At step S103, the processor 10 specifically refers to each of the signal levels from the sensor groups S1-S5 and S61-S63 input through the input-output interface 14 every sampling period depending on each sensor, and temporarily stores the signal level in the internal memory of the processor 10 or a memory integrated in the input-output interface 14. The sampling period for each sensor can be the same as or different from the predetermined sampling period.

At step S103, the processor 10 does not need to input all the information that can be acquired by the input-output interface 14 as will be described later. The processor 10 can acquire only a traveling speed and a cadence. The processor 10 can perform pre-processing such as discrimination, extraction, computation, etc. on the input information that can be acquired.

A control part of the processor 10 refers to actual control data of an object to be controlled in association with the input information acquired at step S103 (step S105). The control data represents details of the operation accepted by the user operated part D1. The control part of the processor 10 refers to a gear stage or a gear ratio for the transmission E, for example, at step S105. In this case, the processor 10 can recognize the gear stage based on a signal from the user operable input device D or can recognize the current gear stage with reference to the information fed back from the transmission E. The control data in association with the input information referred to at step S105 can be a state a predetermined time (10 milliseconds, 50 milliseconds, 100 milliseconds, 1 second, for example) after the input information is input.

The processor 10 reads out setting corresponding to the mode determined at step S101 from the setting information stored in the storage 12 (step S107) and selects input information to be input from the input information acquired based on the setting (step S109). By the processing at step S109, for one of the learning models 1Ma, 1Mb, . . . corresponding to the determined mode, out of the input information acquired at step S103, pieces of input information different in combination from the other learning models 1Ma, 1Mb, . . . corresponding to the other modes are selected and input.

The processor 10 assigns weights included in the setting to the selected input information (step S111). By the processing at step S111, for the one of the learning models 1Ma, 1Mb, . . . corresponding to the determined mode, multiple pieces of data included in the input information acquired at step S103 are assigned with weights different from those to be assigned to the other learning models 1Ma, 1Mb, . . . corresponding to the other modes.

The processor 10 labels the pieces of input information that have respectively been extracted and weighted at step S109 and step S111 with the control data that had been referred to at step S105 to thereby create training data (step S113). The processor 10 inputs the labeled input information to the NN 13 corresponding to the determined mode (step S115). The processor 10 performs training processing for training parameters in the intermediate layer of the NN 13 (step S117). The processor 10 ends the training based on the input information for one sampling timing after execution of the training processing.

The method of creating the different learning models 1Ma, 1Mb, . . . is not limited to the supervised learning method in which information is labeled with control data concerning actual control as described above. The learning models 1Ma, 1Mb, . . . can be created based on the NN 13 from which output information concerning control is output as numerical values. The processor 10 can train each of the learning models 1Ma, 1Mb, . . . using parameters in the intermediate layer 133 with the use of an error propagation method by calculating an error based on actual control data. Using the NN 13 that outputs the gear stage for the transmission E as a numerical value, for example, an error between the output gear stage and the actual gear stage is calculated, and at least one of the weight and bias in the intermediate layer 133 can be trained while the calculated error is propagated. Furthermore, using the NN 13 created in advance in such a manner that input information labeled with a gear stage or a gear ratio is accumulated and given as an initial state, the processor 10 can perform training such that the error between the gear stage or gear ratio output from the NN 13 and the actual gear stage or gear ratio is minimized by the error propagation method. As will be described later, the processor 10 can perform training by reinforcement learning that advances the training by providing an evaluation based on a comparison between the output information concerning control that is output and the actual control data. The learning algorithms can be different among the different learning models 1Ma, 1Mb, . . . .

Figure 4:
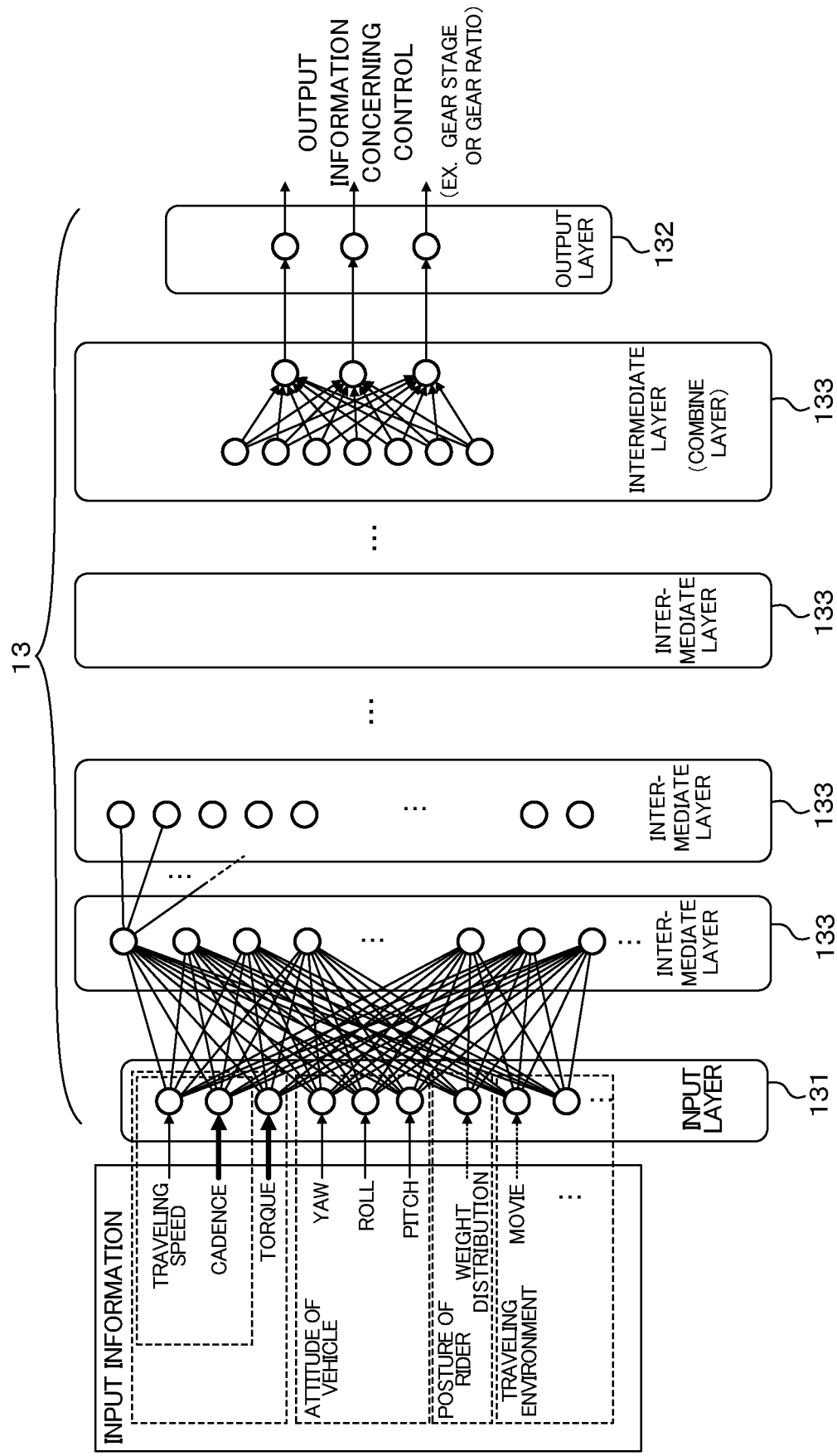
FIG. 4 illustrates one example of a learning model to be created by the processor of the controller using a learning algorithm.
Figure 5:
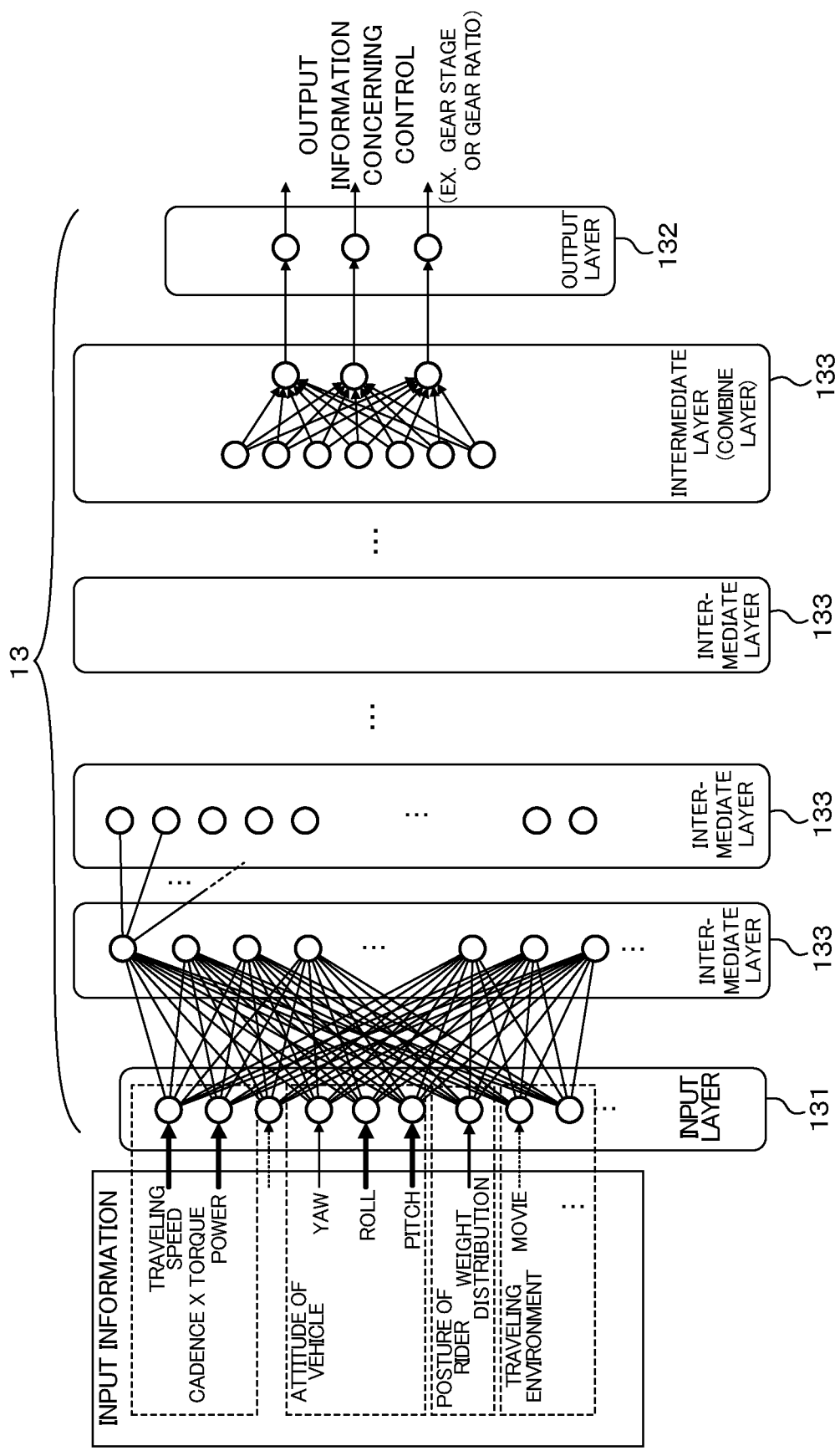
FIG. 5 illustrates another example of a learning model to be created by the processor of the controller using the learning algorithm.

By repetitively executing the training processing illustrated in the flowchart of FIG. 3 for each of the selected modes, the NN 13 is changed to each of the learning models 1Ma, 1Mb, . . . that outputs output information concerning control of the components of the human-powered vehicle A based on the input information concerning traveling of the human-powered vehicle A. The NN 13 is created as each of the learning models 1Ma, 1Mb, . . . corresponding to the selected mode. FIG. 4 and FIG. 5 illustrate examples of the learning models 1Ma, 1Mb, . . . to be created. As illustrated in FIG. 4 and FIG. 5, the learning models 1Ma, 1Mb, . . . each include an input layer 131 to which multiple pieces of input information acquired from the sensor groups S1-S5 and S61-S63 are input and an output layer 132 from which control data is output. Each of the learning models 1Ma, 1Mb, . . . includes an intermediate layer 133, which is located between the input layer 131 and the output layer 132, includes a group of nodes formed by one or more layers. The intermediate layer 133 connected to the output layer 132 is a connected layer for aggregating the multiple nodes into the number of nodes in the output layer 132. Three nodes are illustrated in the output layer 132 in the examples in FIG. 4 and FIG. 5, not limited thereto. The nodes of the intermediate layer 133 each have a parameter including at least one of the weight and the bias in association with the node in the previous layer. The processor 10 creates training data by labeling input information with actual control data in association with the input information based on the learning program 1P. The processor 10 inputs the created training data to the input layer 131 for each selected mode, so that the parameters in the intermediate layer 133 are trained.

With reference to FIG. 4 and FIG. 5, the learning models 1Ma, 1Mb, . . . will specifically be described. In the illustrated example, each of the learning models 1Ma, 1Mb, . . . from which output information concerning control of a gear stage or a gear ratio for the transmission E is output will be described. As illustrated in FIG. 4 and FIG. 5, traveling speed obtained from the speed sensor S1 is input to the input layer 131. The traveling speed is speed per hour, for example. The traveling speed can be the number of rotations of the front wheel A3 or the rear wheel A4 per unit time. A cadence obtained from the cadence sensor S2 is input to the input layer 131. At least one of the traveling speed of the human-powered vehicle A and the cadence of the crank B1 of the driving mechanism B is input to the input layer 131. As illustrated in the learning model 1Mb of FIG. 5, power obtained by computation using the torque and the cadence can be input to the input layer 131. A torque obtained from the torque sensor S3 can be input to the input layer 131. In the learning model 1Ma illustrated in FIG. 4, the cadence and the torque are input while assigned with much larger weights than the other input information based on the setting of the corresponding mode. In the learning model 1Mb illustrated in FIG. 5, the traveling speed is input while assigned with a much larger weight than the other input information based on the setting of the corresponding mode.

Detection data of the attitude of the human-powered vehicle A obtained from the gyro sensor S4 is input to the input layer 131. The detection data is information indicating the inclination of the human-powered vehicle A. The inclination is represented by a yaw component having an axis in the vertical direction, a roll component having an axis in the forward and backward direction of the human-powered vehicle A and a pitch component having an axis in the right and left direction of the human-powered vehicle A. In the learning model 1Mb illustrated in FIG. 5, the inclinations of roll and pitch are input while assigned with much larger weights than the other input information based on the setting of the corresponding mode.

A video signal obtained from the image sensor S5 is input to the input layer 131. The video signal obtained from the image sensor S5 is a video signal corresponding to the user's field of vision, that is, data obtained by detecting a traveling environment. In the first example, the input video signal is each of the successive multiple frame images. In the second example, the input video signal is multiple pieces of data obtained by performing various filter processing on a frame image. In the third example, the input video signal is information indicating the kind of an object present in the direction of travel recognized by the image recognition part based on the video from the image sensor S5. The distance from the object present in the direction of travel can be included. The distance can be a distance obtained according to the image processing by the image recognition part or data obtained by a radar that had been mounted on the human-powered vehicle A. In the learning model 1Ma illustrated in FIG. 4 and the learning model 1Mb illustrated in FIG. 5, a video signal is not selected as input information or input while assigned with a much smaller weight than the other information.

Another example of the detection data for a traveling environment is time data, weather data, luminance data or humidity data. The time data is, for example, a time measured by an internal timer of the processor 10. The weather data is, for example, at least one of localized rainfall amounts, humidity, the velocity of wind and the direction of wind in the place where the human-powered vehicle A is traveling that can be acquired from an external server handling weather data. The humidity data can be obtained from a humidity sensor mounted on the main body A1 of the human-powered vehicle A. The luminance data can be obtained by provision of a luminance sensor at any position of the main body A1 of the human-powered vehicle A, for example, at the handlebar A2.

Detection data of the user's posture obtained from each of the posture sensors S61, S62 and S63 is input to the input layer 131. The detection data is weight distribution data, for example. The posture sensors S61, S62 and S63 in the present embodiment are piezoelectric sensors. In the first example, signals output from the posture sensors S61, S62 and S63 are input to the input layer 131 as it is. In the second example, the processor 10 determines whether the rider is in a basic posture, a forwardly-tilted posture or is standing on pedals by performing a predetermined computation and inputs the discrimination result to the input layer 131. In the learning model 1Ma illustrated in FIG. 4, the weight distribution indicating the posture of the user is not selected as input information, or is input while assigned with a much smaller weight than the other information.

Information to be input to the input layer 131 can be different among the different learning models 1Ma, 1Mb, . . . as described above. All the input information to be selected do not need to be input to the input layer 131. As indicated by dotted lines in FIG. 4, the input information to be selected can be divided into groups, and the input information can be input to a different NN 13 for each group. In this case, the output layer 132 can output information concerning control for each group.

The output layer 132 outputs information being at least one of a gear stage and a gear ratio for the transmission E. More specifically, the output layer 132 outputs ratios respectively corresponding to the nodes of the gear stage and the gear ratio. This allows the processor 10 to select the gear stage with the highest probability.

As illustrated in FIG. 4 and FIG. 5, the different learning models 1Ma, 1Mb, . . . are different in the details of input information or different in the distribution of the weights of the input information. The learning models 1Ma, 1Mb, . . . having the same input information and its distribution of weights can produce different output information. By such training processing, the learning models 1Ma, 1Mb, . . . different from one mode to another are created that output information adapted to a way of riding by the user depending on the various input information.

Figure 6:
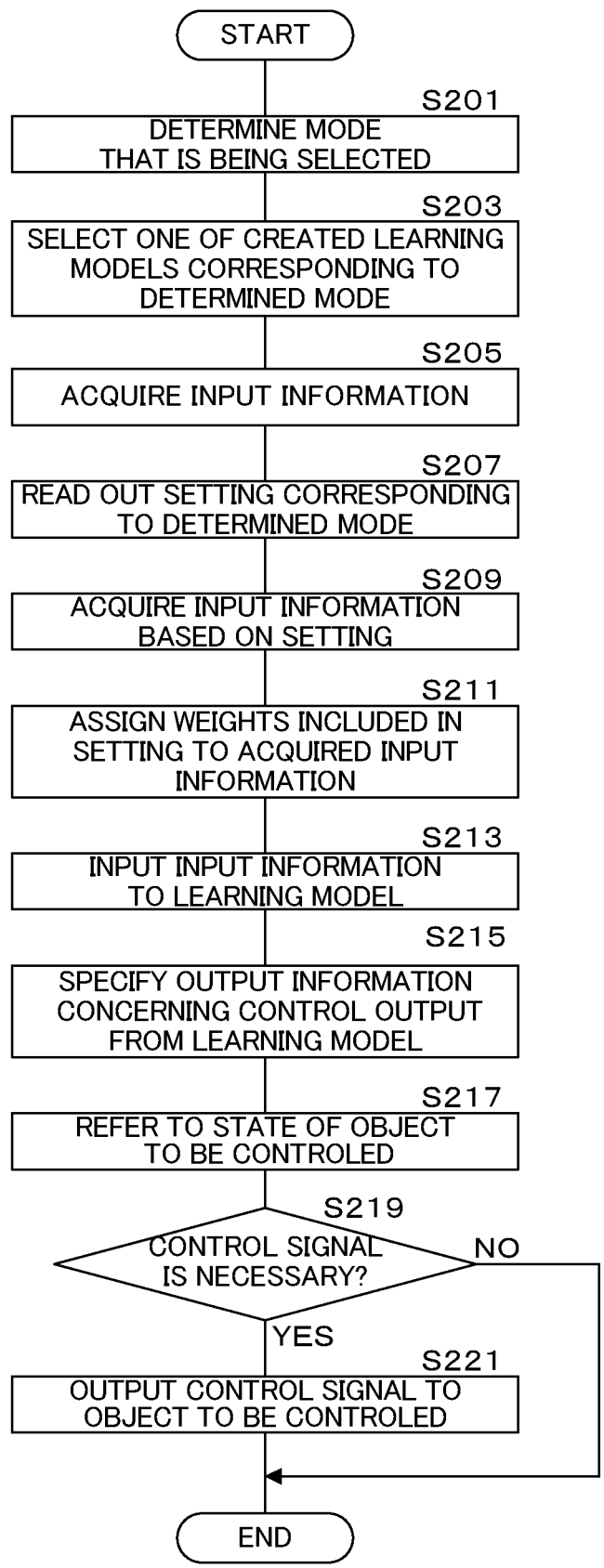
FIG. 6 is a flowchart depicting one example of a processing procedure in an automatic control mode performed by the processor of the controller.

Secondly, the operation of the controller 100 under the automatic control mode will be described. FIG. 6 is a flowchart depicting one example of a processing procedure in the automatic control mode performed by the processor 10. The processor 10 repeatedly executes the processing procedure illustrated in the flowchart in FIG. 6 during the automatic control mode. The processing procedure can be executed for each predetermined control period (30 milliseconds, for example).

The processor 10 determines a mode that is being selected by the user operable input device D out of the different modes (step S201). The processor 10 accepts selection of one of the different learning models 1Ma, 1Mb, . . . by the mode selection via the user operated part D1 of the user operable input device D at step S201. The processor 10 selects one of the created learning models 1Ma, 1Mb, . . . corresponding to the determined mode and reads it out from the storage 12 (step S203).

The processor 10 acquires input information concerning traveling of the human-powered vehicle A through the input-output interface 14 (step S205). The processor 10 corresponds to an "acquisition part" of the "component control device" at step S205. At step S205, the control part of the processor 10 refers to the signal levels from the sensor groups S1-S5 and S61-S63 input through the input-output interface 14 every control period, and temporarily stores them in the internal memory of the processor 10 or the memory integrated in the input-output interface 14.

The processor 10 reads out setting corresponding to the mode determined at step S201 or the one of the learning models 1Ma, 1Mb, . . . selected at step S203 from the setting information stored in the storage 12 (step S207). The processor 10 acquires input information being brought into correspondence with the selected one of the learning models 1Ma, 1Mb, . . . out of the input information acquired based on the setting at step S205 (step S209). The processor 10 assigns weights included in the setting to the acquired input information (step S211).

The processor 10 inputs the input information that have been selected at step S209 and have been assigned with weights at step S211 to the one of the learning models 1Ma, 1Mb, . . . that had been read out at step S203 (step S213).

The processor 10 specifies output information concerning control of the component to be controlled that is to be output by inputting the acquired input information to the selected one of the learning models 1Ma, 1Mb, . . . (step S215). The processor 10 specifies, for example, a result of discrimination as to any one of the gear stage and the gear ratio for the transmission E as output information at step S215.

The control part of the processor 10 refers to the state of the component to be controlled based on the specified output information (step S217). The processor 10 determines whether or not an output of a control signal is necessary based on the relation between the details of the control indicated by the specified output information and the state that has been referred to (step S219).

If determining that an output of a control signal is necessary at step S219 (S219: YES), the processor 10 outputs a control signal for controlling a component based on the specified output information to the component to be controlled (step S221), and ends the control processing performed in one control period. If determining that an output of a control signal is not necessary at step S219 (S219: NO), the processor 10 ends the processing without outputting a control signal based on the specified output information concerning control to the object to be controlled. The reference processing at step S217 and the determination processing at step S219 are not necessarily made. In this case, the processor 10 can specify the result of a discrimination between a gear stage and a gear ratio for the transmission E, for example, as output information at step S215, and can output to the component to be controlled a control signal based on the specified output information concerning control without referring to the state of the component to be controlled based on the specified output information (S221).

The control part of the processor 10 refers to, for example, a gear stage or a gear ratio for the transmission E at step S217. In this case, at step S219, the processor 10 compares the gear stage or the gear ratio specified at step S215 and the gear stage or gear ratio referred to at S217 and determines whether or not a difference is present. If determining that a difference is present, the processor 10 determines that an output of a control signal is necessary at step S219.

The learning mode in the first embodiment can be executed from time when the controller 100 in an initial state is placed in the human-powered vehicle A to when the error between the output information output from each of the learning models 1Ma, 1Mb, . . . and the control data concerning control based on the actual operation tapers to a predetermined error or smaller. After tapering, the processor 10 of the controller 100 can be operated in the automatic control mode. The learning mode can also be executed until the error similarly tapers after any reset operation is performed.

In the first embodiment, the controller 100 accepts mode selection by the mode selection button D2 of the user operable input device D to thereby accept selection of any one of the different learning models 1Ma, 1Mb, . . . . The controller 100 can autonomously select a mode based on the traveling environments, not accepting mode selection by operation. The controller 100 can select a different mode based on the schedule set in advance.

Second Embodiment

Figure 7:
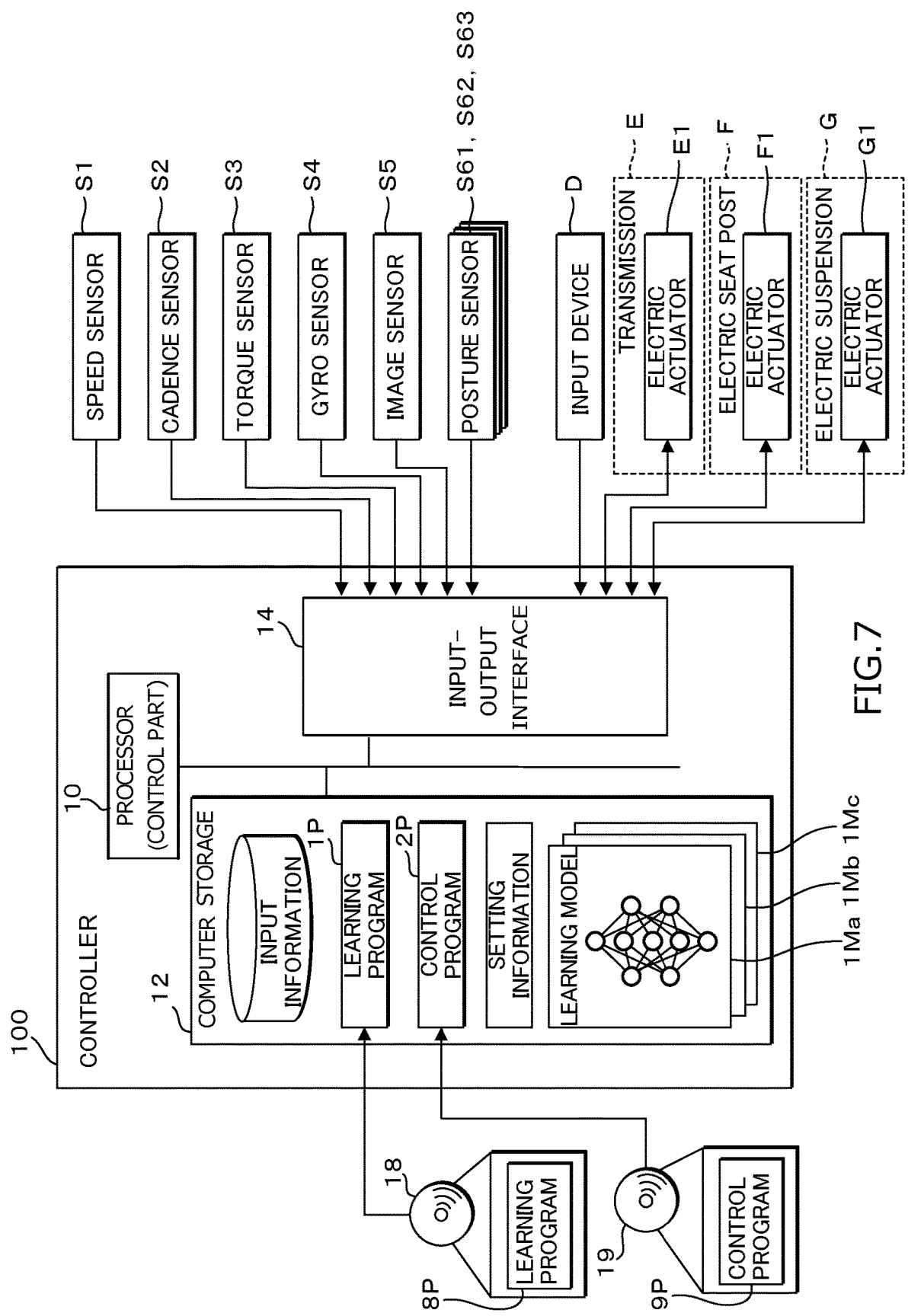
FIG. 7 is a block diagram schematically illustrating a bicycle component control system including the controller, a plurality of sensors, a user operable input device and a plurality of bicycle components according to a second embodiment.

FIG. 7 is a block diagram illustrating the internal configuration of a controller 100 according to a second embodiment. The human-powered vehicle A and the controller 100 in the second embodiment are similar in configuration to those in the first embodiment except for a storage and the details of processing that are to be described later, and the common components will be denoted by the same reference codes and detailed description thereof will not be repeated. In the second embodiment, the storage 12 of the controller 100 stores input information input through the input-output interface 14 from the sensor groups S1-S5 and S61-S63 mounted on the human-powered vehicle A together with time information by multiple sampling periods. The storage 12 cyclically stores the input information utilizing storage areas of the multiple sampling periods so that the old input information is automatically overwritten.

Figure 8:
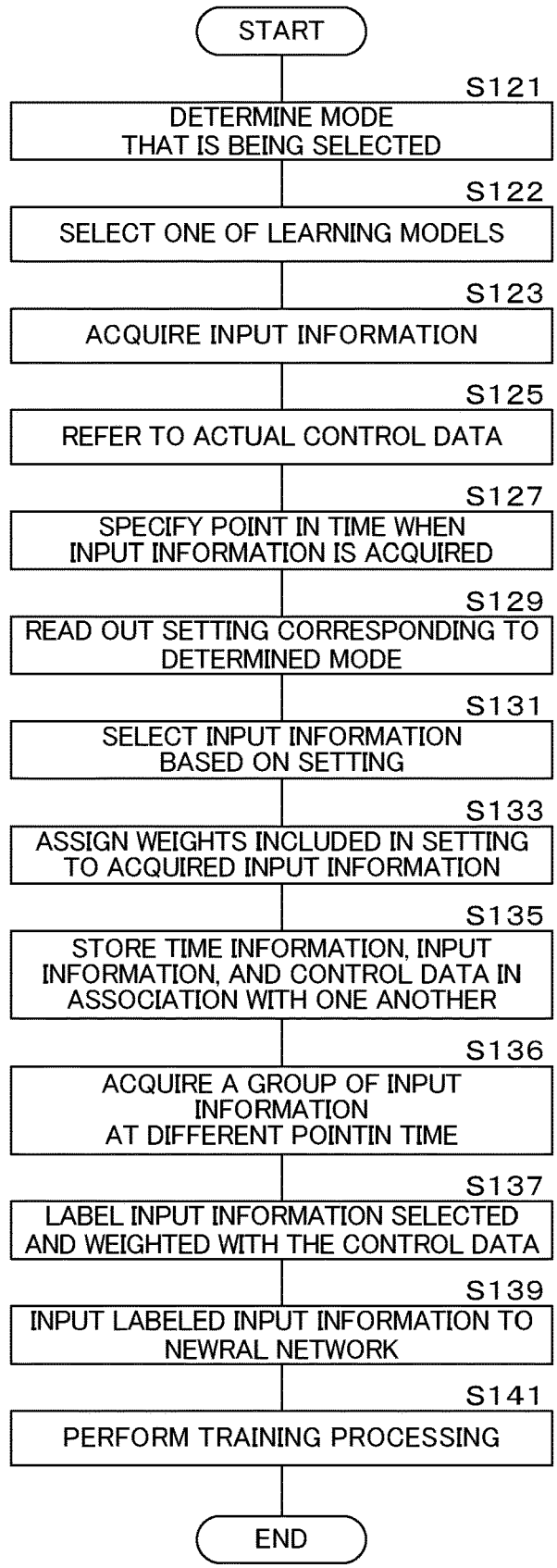
FIG. 8 is a flowchart depicting one example of a processing procedure in a learning mode performed by the processor of the controller according to the second embodiment.

FIG. 8 is a flowchart depicting one example of a processing procedure in a learning mode performed by a processor 10 according to the second embodiment. The processor 10 repeatedly executes the processing procedure of the flowchart illustrated in FIG. 8 every predetermined sampling period (30 milliseconds, for example) during the learning mode for each component to be controlled.

The processor 10 determines a mode that is being selected by the user operable input device D out of different modes (step S121). The step S121 corresponds to a "selection input." At step S121, the processor 10 can determine which mode is being selected via the user operable input device D as described above. The processor 10 selects a targeted one of the learning models 1Ma, 1Mb, . . . corresponding to the determined mode out of the different learning models 1Ma, 1Mb, . . . (step S122).

The processor 10 acquires input information concerning traveling of the human-powered vehicle A through the input-output interface 14 (step S123) and refers to actual control data of a component to be controlled at substantially the same timing (step S125). At step S125, the control part of the processor 10 refers to, for example, a gear stage or a gear ratio for the transmission E. The processor 10 specifies the point in time when the input information is acquired at step S123 (step S127). The processor 10 can employ timing information acquired from the internal timer as an acquisition point in time, or can convert the timing information into time information and employ the time information.

The processor 10 reads out the setting corresponding to the mode determined at step S121 from the setting information stored in the storage 12 (step S129) and selects information to be input from the input information acquired based on the setting (step S131). The processor 10 assigns weights included in the setting to the selected input information (step S133).

The processor 10 stores the time information indicating the point in time specified at step S127, the input information that have respectively been extracted and weighted at step S131 and step S133 and the actual control data that had been referred to at step S125 in the storage 12, while being associated with one another (step S135).

The processor 10 acquires a group of input information acquired at different points in time that have been stored in the storage 12 (step S136). The processor 10 labels the acquired group of input information with the control data that has been referred to at step S125 to create training data (step S137). The processor 10 inputs the labeled group of input information acquired at different points in time to the NN 13 corresponding to the selected one of the learning models 1Ma, 1Mb, . . . (step S139). The processor 10 executes training processing for training parameters in the intermediate layer of the NN 13 (step S141) and ends the learning processing at one sampling timing.

FIG. 9 illustrates one example of the contents of input information stored in the storage 12 and the outline of training. As illustrated in FIG. 9 in the second embodiment, training processing is executed for each of the learning models 1Ma, 1Mb, . . . using the input information acquired at different points in time and the control data being a result of the change of the input information that are stored in the storage 12 as training data. The actual component control is performed based on the change of state of the traveling human-powered vehicle A depending on its context, not performed independently for every sampling period. It is assumed that each of the learning models 1Ma, 1Mb, . . . outputting control data based on the input information at multiple points in time is created for each mode and used for reproducing control of the components in practice depending on the situations.

In the second embodiment, the processor 10 gives multiple pieces of input information to one of the learning models 1Ma, 1Mb, . . . corresponding to the selected mode and controls the components based on the control data output from the one of the learning models 1Ma, 1Mb, . . . in the automatic control mode as well. The sampling period of input information, that is, the interval during which the input information is acquired can be set to be different among the different learning models 1Ma, 1Mb, . . . . . A different sampling period can be set for each of the learning models 1Ma, 1Mb, . . . . . An appropriate sampling period for each of the learning models 1Ma, 1Mb, . . . can be evaluated by the learning algorithm.

Figure 10:
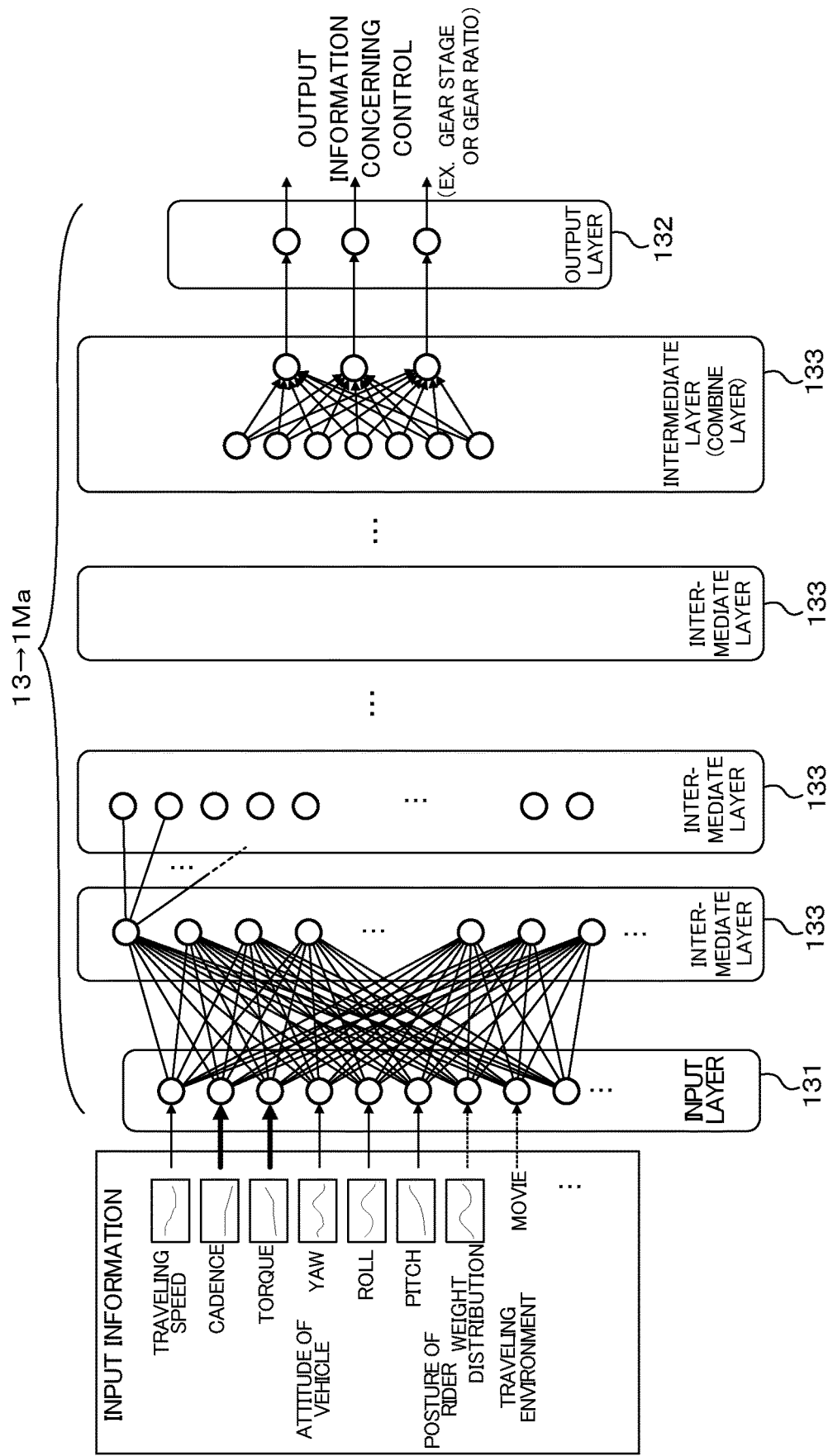
FIG. 10 is one example of a learning model to be created by the processor of the controller using the learning algorithm according to the second embodiment.
Figure 11:
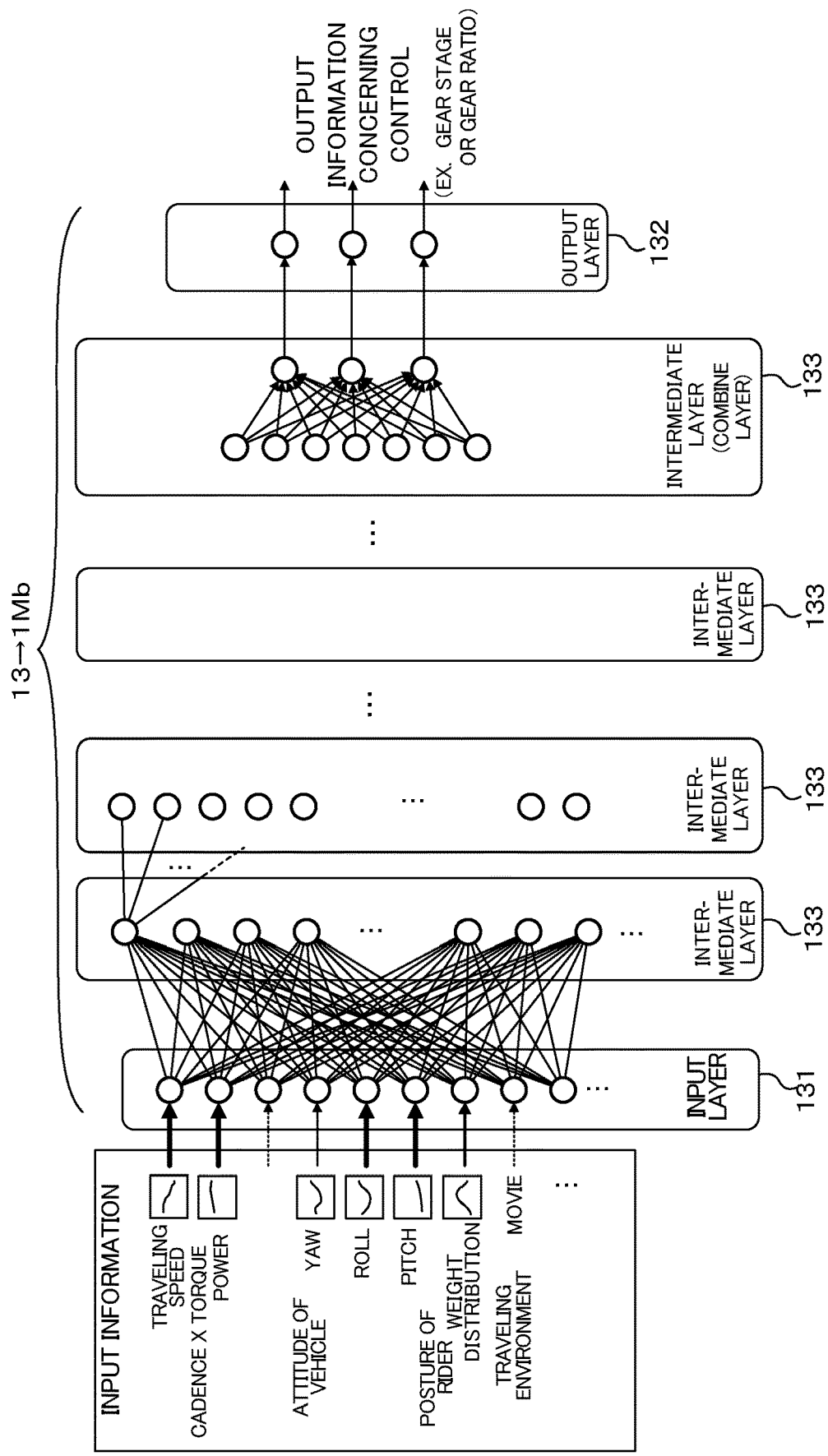
FIG. 11 is another example of a learning model to be created by the processor of the controller using the learning algorithm according to the second embodiment.

In the second embodiment, in place of an input of the multiple pieces of input information at step S139, variations in the multiple pieces of input information can be input. The processor 10 can acquire input information in different points in time before and after every sampling period, calculate the variation in the input information and input the calculated variation in the input information to a selected one of the learning models 1Ma, 1Mb, . . . . . The processor 10 can input a trend of the variation (increase, decrease, maintenance) to each of the learning models 1Ma, 1Mb, . . . , or can calculate a waveform corresponding to a time series distribution as a variation and input the calculation result to the selected one of the learning models 1Ma, 1Mb, . . . . . The variation value can include one or multiple times of time differential values. FIG. 10 and FIG. 11 are examples of the learning models 1Ma and 1Mb to be created in the second embodiment. As compared with the examples illustrated in FIG. 4 and FIG. 5 of the first embodiment, FIG. 10 and FIG. 11 are different in that each piece of input information is a waveform representing its variation. The learning model 1Ma in FIG. 10 and the learning model 1Mb in FIG. 11 are different from each other in the details of selection of the input information, weights as well as the range of the variations. Hence, the duration of time corresponding to the variation of the input information can be different among the different learning models 1Ma, 1Mb, . . . .

Third Embodiment

Figure 12:
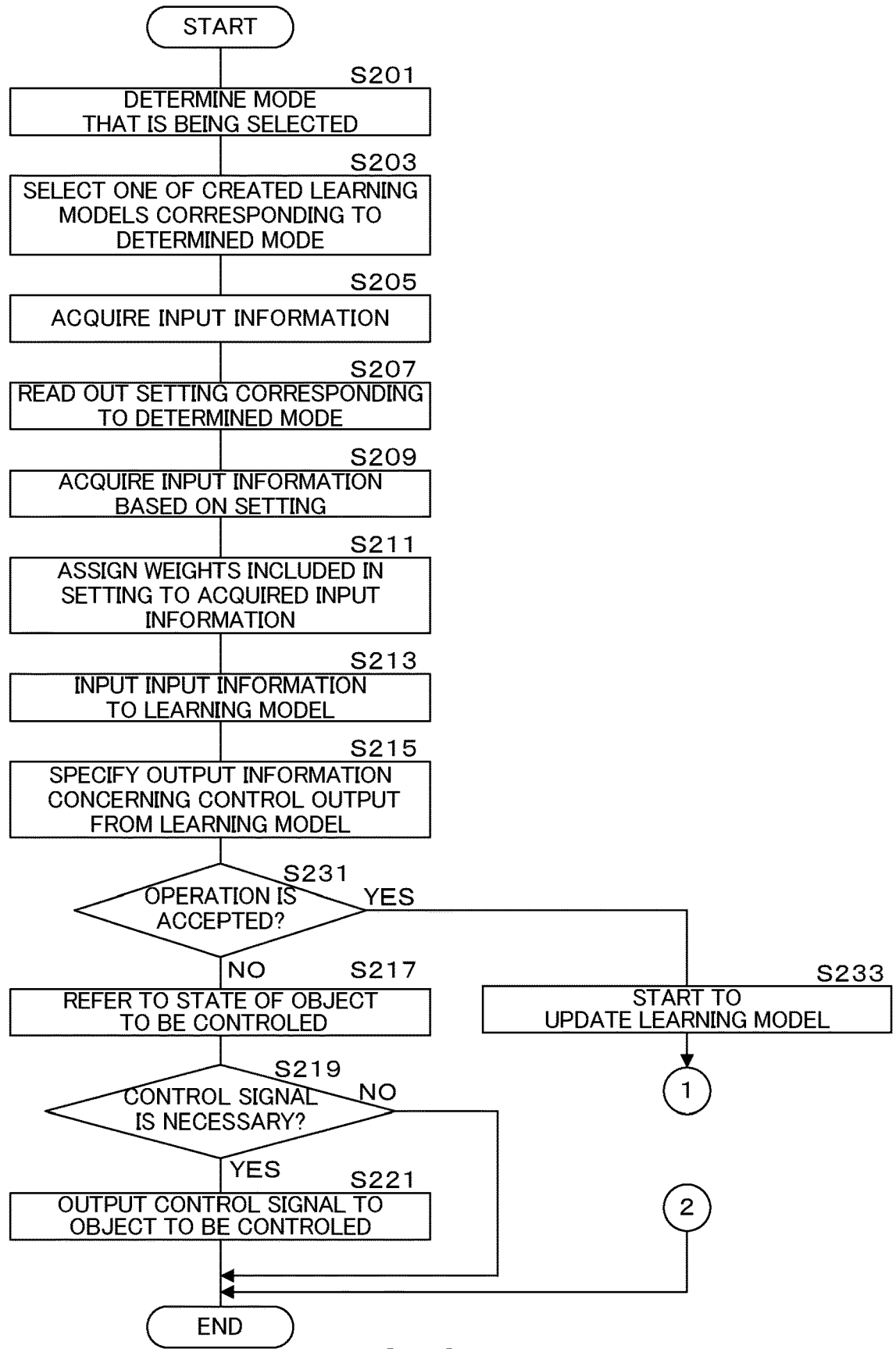
FIG. 12 is a first flowchart part depicting one example of a processing procedure performed by a processor according to a third embodiment.
Figure 13:
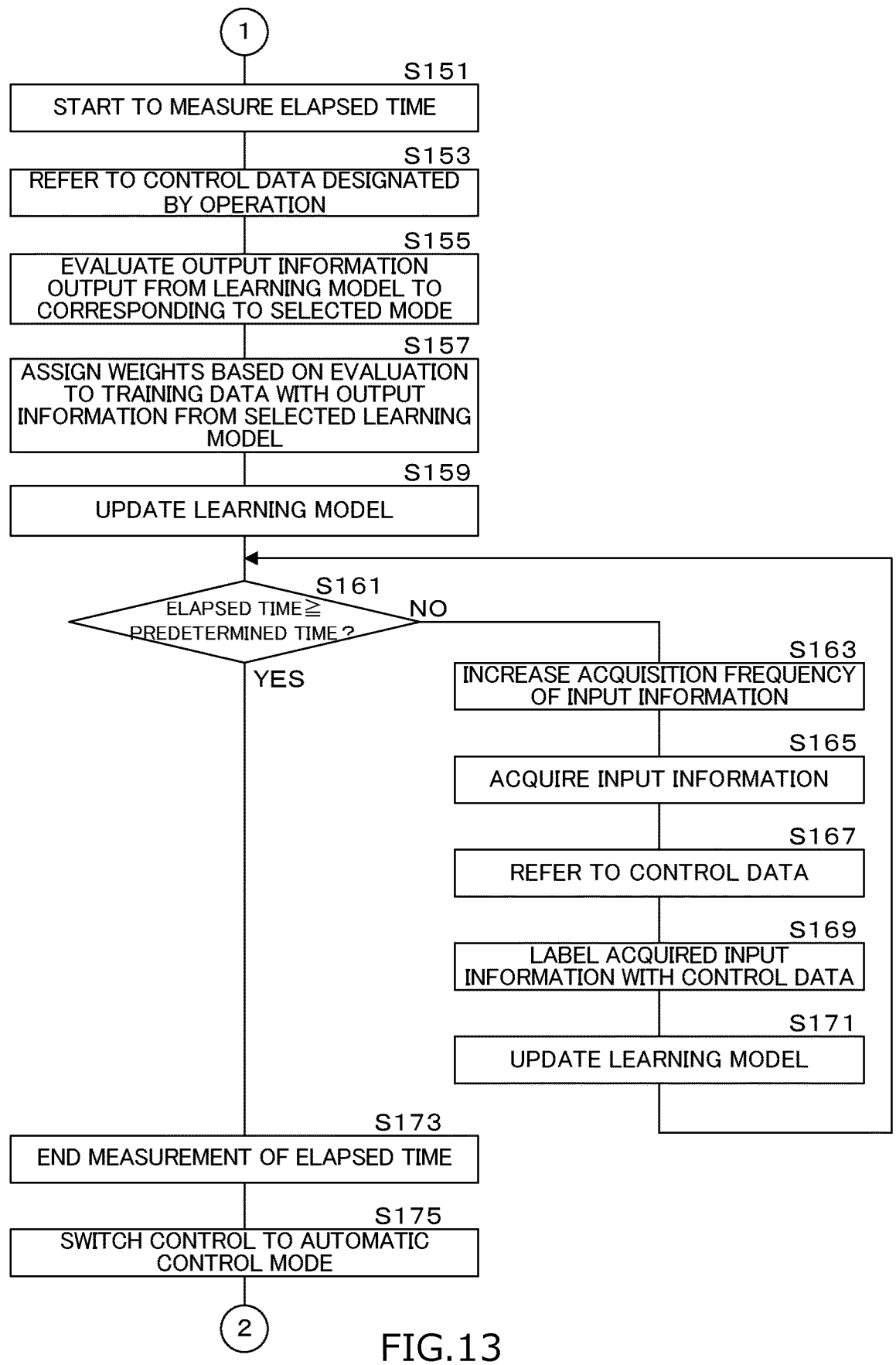
FIG. 13 is a second flowchart part depicting the example of the processing procedure performed by the processor of the controller according to the third embodiment.

In a third embodiment, the controller 100 switches between the learning mode and the automatic control mode based on operation performed on the user operated part D1 of the user operable input device D. The processor 10 updates a learning model 1M based on the operation performed on the user operated part D1 in the learning mode. FIG. 12 and FIG. 13 are each a flowchart depicting one example of a processing procedure performed by the processor 10 in the third embodiment. The processor 10 repeatedly executes the following processing procedure when operated in the automatic control mode. Some of the processing procedure shown in the flowcharts illustrated in FIG. 12 and FIG. 13 common to those shown in the flowchart illustrated in FIG. 6 of the first embodiment will be denoted by the same step numbers, and detailed description thereof will not be repeated.

The processor 10 selects input information in association with a selected one of the learning models 1Ma, 1Mb, . . . corresponding to the selected mode, assigns weights to the selected input information and inputs the weighted input information (S213), and specifies output information concerning control to be output from the selected one of the learning models 1Ma, 1Mb, . . . (S215). Subsequently, the processor 10 determines whether or not operation is accepted by the user operated part D1 (step S231). The processor 10 determines whether or not switching operation between the gear stage and the gear ratio is performed on the user operated part D1 in the third embodiment. In the case of control of the components other than the transmission E, operation concerning control of each of the components can be accepted by the user operated part D1. If determining that no operation is accepted at step S231 (S231: NO), the processor 10 continues the operation under the automatic control mode (S217-S221).

The processor 10 can be set so as to determine that operation is performed at step S231 since the need for training arises if shifting operation of the gear stage is made in the direction opposite to the output information output at step S215 and set so as not to determine that operation is performed if they are made in the same direction.

If it is determined that operation is accepted by the user operated part D1 at step S231 (S231: YES), then the processor 10 starts to update the learning model 1M in the learning mode (step S233).

The processor 10 starts to measure an elapsed time when the operation in the learning mode is started regarding the operation by the user operated part D1 as a trigger (step S151).

The control part of the processor 10 refers to the control data designated by the operation of the user operated part D1, that is, a gear stage or a gear ratio in the third embodiment under the learning mode (step S153). The processor 10 evaluates the output information output from the selected one of the learning models 1Ma, 1Mb, . . . to be targeted based on the control data referred to at step S153 (step S155). At step S155, the processor 10 corresponds to an "evaluation part."

At step S155, the processor 10 makes an evaluation by checking the output information from one of the learning models 1Ma, 1Mb, . . . corresponding to the mode that is being selected specified at step S215 against the control data based on the designation operation that has been referred to at step S153. For example, the processor 10 determines whether or not the output information output from the one of the learning models 1Ma, 1Mb, . . . and the details of the designation operation match within a predetermined error range. If determining that a match occurs, then the processor 10 provides a high evaluation. If the output information output from a targeted one of the learning models 1Ma, 1Mb, . . . and the details of the designation operation do not match, the processor 10 provides a low evaluation to the output information for the targeted one of the learning models 1Ma, 1Mb, . . . . If determining that a match does not occur, then the processor 10 provides a different evaluation depending on the degree of match between the output information specified at step S215 and the control data that has been referred to at step S153. As the difference between the output information specified at step S215 and the control data that has been referred to at step S153 is larger, the processor 10 provides a lower evaluation. If shifting operation of a gear stage by the user operated part D1 is made in the direction opposite to the control data output at step S215, then the processor 10 provides a much lower evaluation. For example, the evaluation can be represented by a numerical value, and positive values are assumed for the high evaluation while negative values are assumed for the low evaluation. The degree of evaluation is assumed to be larger as the absolute value is larger.

The processor 10 assigns weights based on the evaluation at step S155 to the training data created by labeling the input information acquired at step S211 with the output information output from the selected one of the learning models 1Ma, 1Mb, . . . to be targeted (step S157). The processor 10 updates the selected one of the learning models 1Ma, 1Mb, . . . to be targeted based on the training data assigned with the weights based on the evaluation (step S159). At step S157, the processor 10 assigns weights indicating a higher degree of importance to the training data as the evaluation is lower. The processing at steps S157 and S159 can be executed in the case where the output information output from the selected one of the learning models to be targeted and the details of the designation operation do not match with each other in the evaluation at step S155.

The processor 10 determines whether or not the elapsed time started to be measured at step S151 is equal to or more than a predetermined time (step S161).

If determining that the elapsed time is less than the predetermined time (S161: NO), then the processor 10 makes the sampling period shorter, that is, increases the acquisition frequency of input information (step S163). The processor 10 acquires input information at the changed sampling period and selects information based on the setting corresponding to the mode that is being selected (step S165). The control part of the processor 10 refers to actual control data (step S167), and creates training data by labeling the input information acquired at step S165 with the referred-to control data (step S169). The processor 10 updates one of the learning models 1Ma, 1Mb, . . . selected by being brought into correspondence with the mode that is being selected based on the training data of the labeled input information (step S171) and returns the processing to step S161. At step S169, the processor 10 can assign weights indicating the degree of importance of the labeled input information to be input depending on the degree of evaluation at step S155 to the training data and provide the weighted training data to the corresponding one of the learning models 1Ma, 1Mb, . . . .

If determining that the elapsed time is equal to or more than the predetermined time at step S161 (S161: YES), then the processor 10 ends the measurement of the elapsed time (step S173), ends the operation in the learning mode, switches it to the automatic control mode (step S175) and ends the processing.

In the third embodiment, the controller 100 can temporarily store, one by one, multiple pieces of input information in time series in the storage 12 in association with actual control data based on the designation operation similarly to the second embodiment. The processor 10 can select and store input information based on the setting corresponding to the mode that is being selected. The processor 10 can perform the following processing instead of update with the output information concerning control provided with a low evaluation at step S157. If accepting designation operation performed by the user operated part D1, then the processor 10 sets the input information acquired before and after the timing when the designation operation is performed as input data and updates the selected one of the learning models 1Ma, 1Mb, . . . to be targeted by the input data and the operation details by the user operated part D1. In the first example, the designation detail by the user operated part D1 is at least one of a gear stage and a gear ratio for the transmission E. In the second example, the designation detail is a supported position for the electric seat post F. In the third example, the designation detail is setting information for a damping factor, a stroke amount and a locked out state of the electric suspension G. The following description is made with reference to FIG. 9 in the second embodiment. The actual control data is changed from "2" to "3" at the timing when the processor 10 acquires input information associated with the time information "1645." Hence, it is determined that designation operation is accepted here by the user operated part D1. The processor 10 updates one of the learning models 1Ma, 1Mb, . . . that is being selected based on the training data labeled with the control data "3" of the operation details, not assigning the weight of a low evaluation to the training data obtained by labeling the input information acquired at the time information "1334" before the time information "1645" for the timing of operation with the output information "2." The processor 10 can similarly label the input information acquired at the time information "1028" with the control data rewritten from "2" to "3", and input the labeled input information to the corresponding one of the learning models 1Ma, 1Mb, . . . and update the same.

At step S163, the processor 10 can update one of the learning models 1Ma, 1Mb, . . . by increasing the number of acquisitions instead of or in addition to increasing the acquisition frequency.

In the third embodiment, the processor 10 ends the operation in the learning mode, which is started regarding the operation by the user operated part D1 as a trigger, depending on whether the elapsed time is equal to or more than the predetermined time at step S161 and switches it to the automatic control mode. In place of step S161, the processor 10 can cause the one of the learning models 1Ma, 1Mb, . . . , that has been updated at step 171 to output information concerning control, check the output information concerning control against the control data if designation operation is accepted by the user operated part D1 to thereby reevaluate the output information from the one of the learning models 1Ma, 1Mb, . . . based on the result of checking, and end the operation in the learning mode if a high evaluation occurs. The processor 10 provides a high evaluation if the output information output from the one of the learning models 1Ma, 1Mb, ... matches the control data designated by the operation within a predetermined error range.

Fourth Embodiment

Figure 14:
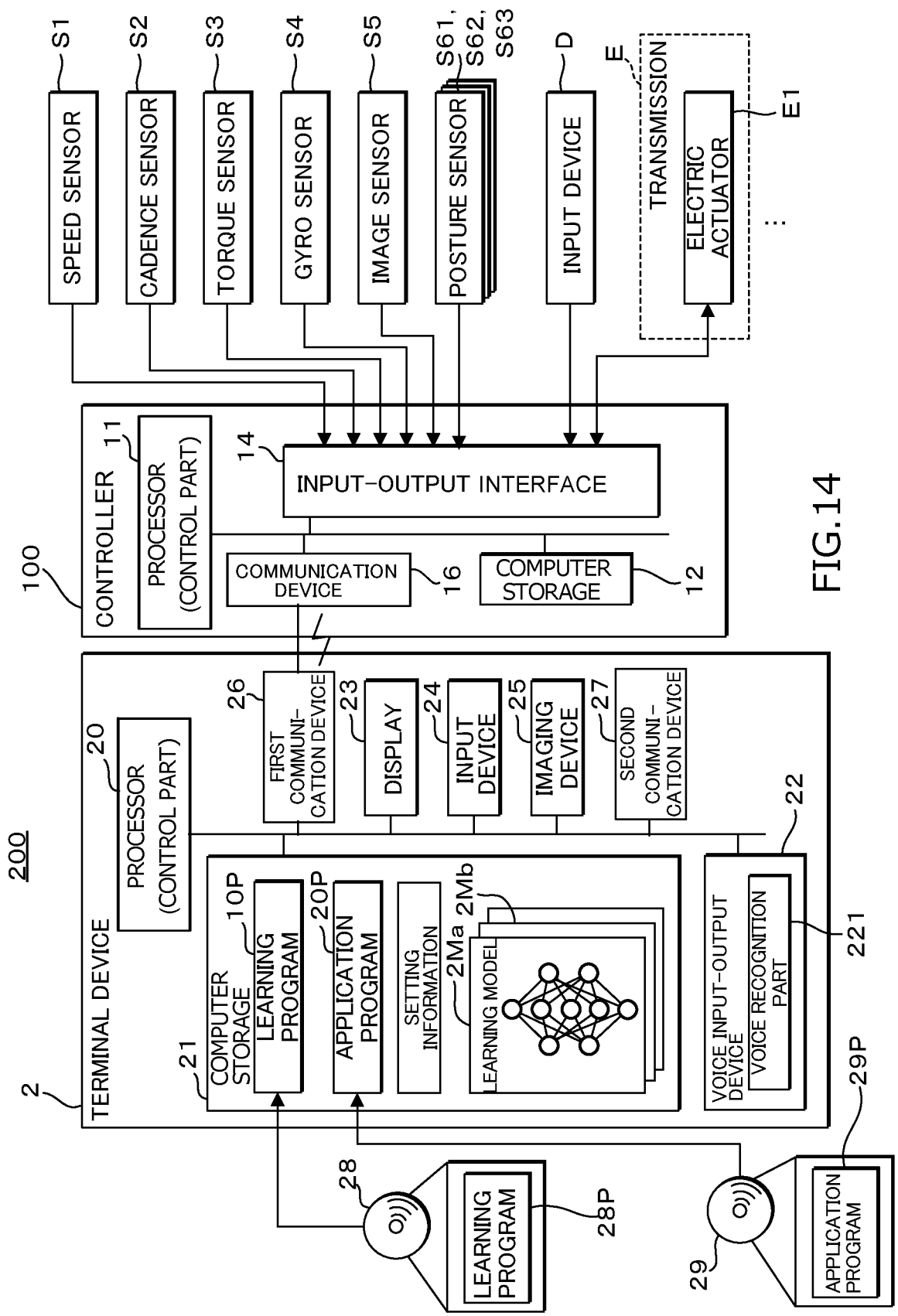
FIG. 14 is a block diagram schematically illustrating the configuration of a bicycle component control system including a terminal device, the controller, a plurality of sensors, a user operable input device and a plurality of bicycle components.

In a fourth embodiment, the learning model creation processing and the component control processing are executed by a terminal device of the user in place of the controller 100. FIG. 14 is a block diagram illustrating the configuration of a control system 200. The control system 200 includes a terminal device 2 and the controller 100. The controller 100 in the fourth embodiment includes a processor 11, a storage 12, an input-output interface 14 and a communication device 16. Some of the components of the controller 100 in the fourth embodiment common to those of the controller 100 in the first and second embodiments will be denoted by the same reference codes, and detailed description thereof will not be repeated.

The processor 11 of the controller 100 in the fourth embodiment, which is a processor utilizing a CPU, executes processing by controlling each of the components with the use of a memory such as a built-in ROM, RAM and so on. The processor 11 does not execute the training processing performed by the processor 10 of the controller 100 in the first embodiment. The processor 11 receives inputs from the sensor groups S1-S5 and S61-S63 mounted on the human-powered vehicle A through the input-output interface 14, and transmits them to the terminal device 2 through the communication device 16. The control part of the processor 11 refers to a control state of the user operable input device D and an operation signal output from the user operable input device D, and transmits them to the terminal device 2 through the communication device 16. The processor 11 applies a control signal to the electric actuator E1 to be controlled based on an operation signal output from the user operable input device D or an instruction output from the terminal device 2.

The communication part 16 is a communication port, and the processor 11 transmits and receives information to and from the terminal device 2 through the communication device 16. The communication device 16 is a universal serial bus (USB) port in the first example. The communication device 16 is a short range wireless communication module such as Bluetooth (registered trademark) in the second example.

The terminal device 2 is a portable communication terminal device to be used by the user. The terminal device 2 is a smartphone in the first example. The terminal device 2 is a wearable device such as a so-called smartwatch or the like in the second example. For the smartphone, a smartphone holding member can be attached to the handlebar A2 of the human-powered vehicle A, and the smartphone can be used while being put on the holding member (see FIG. 15).

The terminal device 2 includes a processor 20, a storage 21, a display 23, a user operable input device 24, an imaging device 25, a first communication device 26 and a second communication device 27.

The processor 20 includes a computer processor such as a CPU, a GPU, and a memory and so on. The processor 20 can be constituted as a single hardware (SoC: System On a Chip) integrated with the processor, the memory, the storage 21, the first communication device 26 and the second communication device 27. The processor 20 executes training of output information concerning control of the human-powered vehicle A and component control based on the training according to an application program 20P stored in the storage 21.

The storage 21 includes a non-volatile memory such as a flash memory, for example. The storage 21 stores a learning program 101) and the application program 20P. The learning program 10P can be included in the application program 20P. The storage 21 stores multiple learning models 2Ma, 2Mb, ... created by the processing performed by the processor 20. The storage 21 stores data to which the processor 20 refers. The learning program 10P can be obtained by reading out a learning program 28P stored in a recording medium 28 and copying it in the storage 21. The application program 20P can be obtained by reading out an application program 29P stored in a storage medium 29 and copying it in the storage 21.

The display 23 includes a display device such as a liquid crystal panel, an organic electroluminescence (EL) display, or the like. The user operable input device 24 is an interface for accepting operation by the user and includes a physical button and a display-integrated touch panel device. The user operable input device 24 can accept operation performed on the screen displayed by the display 23 via the physical button or the touch panel.

The voice input-output device 22 includes a speaker, a microphone and so on. The voice input-output device 22 is provided with a voice recognition part 221 and is able to accept operation by recognizing the details of operation from input voice via the microphone.

The imaging device 25 outputs a video signal obtained by using an image sensor. The processor 20 can obtain an image photographed by an image sensor of the imaging device 25 at any timing.

A communication device is a hardware device capable of transmitting an analog or digital signal over a communication wire, or a wireless signal. One example of communication devices includes a powerline communication module, a USB communications interface, a NIC (network interface card), Wi-Fi devices, and access points. The first communication device 26 is a communication module that corresponds to the communication part 16 of the controller 100. The first communication device 26 is a USB communication port in the first example. The first communication device 26 is a short range wireless communication module in the second example. The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth® communications or any other type of signal suitable for short range wireless communications as understood in the bicycle field.

The second communication device 27 is a wireless communication module for achieving transmission and reception of information to and from another communication device (not illustrated) through a public communication network or according to a predetermined mobile communication standard. The second communication device 27 employs a network card, a wireless communication device or a carrier communication module.

In the fourth embodiment, the controller 100 continuously acquires input information obtained from the sensor groups S1-S5 and S61-S63 mounted on the human-powered vehicle A through the input-output interface 14, and transmits them to the terminal device 2 through the communication device 16.

The processor 20 of the terminal device 2 operates in the learning mode and the automatic control mode. The processor 20 operates in further different modes in each of the learning mode and the automatic control mode. The examples of the details of the different modes are the same as those described in the first embodiment. The processor 20 of the terminal device 2 functions as a creation part that creates different learning models 2Ma, 2Mb, . . . corresponding to the different modes by a learning algorithm of deep learning based on the learning program 10P if operated in the learning mode. In the learning mode, the terminal device 2 corresponds to a "creation device." The processor 20 of the terminal device 2 functions as a control part that automatically controls the components including the transmission E by using one of the learning models 2Ma, 2Mb, . . . corresponding to a selected one of the different modes based on the application program 20P if operated in the automatic control mode. In the automatic control mode, the terminal device 2 corresponds to a "component control device."

The operation of the terminal device 2 in the learning mode is similar to that of the processor 10 of the controller 100 illustrated in the first embodiment or the second embodiment. The operation of the terminal device 2 in the automatic control mode is also similar to that of the processor 10 of the controller 100 illustrated in the first embodiment or the second embodiment.

In the fourth embodiment, the terminal device 2 corresponding to the "creation device" or the "component control device" accepts an evaluation by the user based on the information obtained by the user operable input device 24 or the imaging device 25 and updates one of the learning models 2Ma, 2Mb, . . . corresponding to a selected mode depending on the details of the evaluation.

Figure 15:
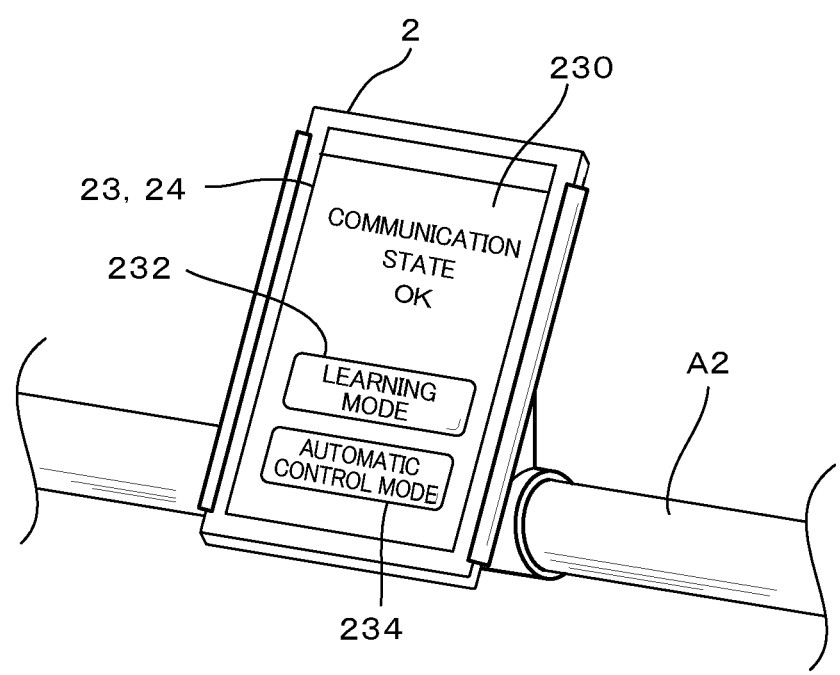
FIG. 15 is a perspective view of a portion of the bicycle having the terminal device displaying an example of a screen that is displayed based on an application program.

FIGS. 15 to 19 each illustrate an example of a screen displayed based on the application program 20P. In the example illustrated in FIG. 15, the terminal device 2 is a smartphone and attached to the handlebar A2 so as to allow the user to view the display 23. FIG. 15 illustrates a main screen 230 displayed on the display 23 based on the application program 20P. The processor 20 causes the display 23 to display the main screen 230 if execution of the application program 20P is selected. The processor 20 establishes communication with the controller 100 when starting execution of the application program 20P. The processor 20 can display a message indicating a communication state on the main screen 230 as illustrated in FIG. 15. On the main screen 230, selection buttons 232 and 234 for the learning mode and the automatic control mode are included. The processor 20 starts operation in the learning mode if the selection button 232 is selected whereas the processor 20 starts operation in the automatic control mode if the selection button 234 is selected.

Figure 16:
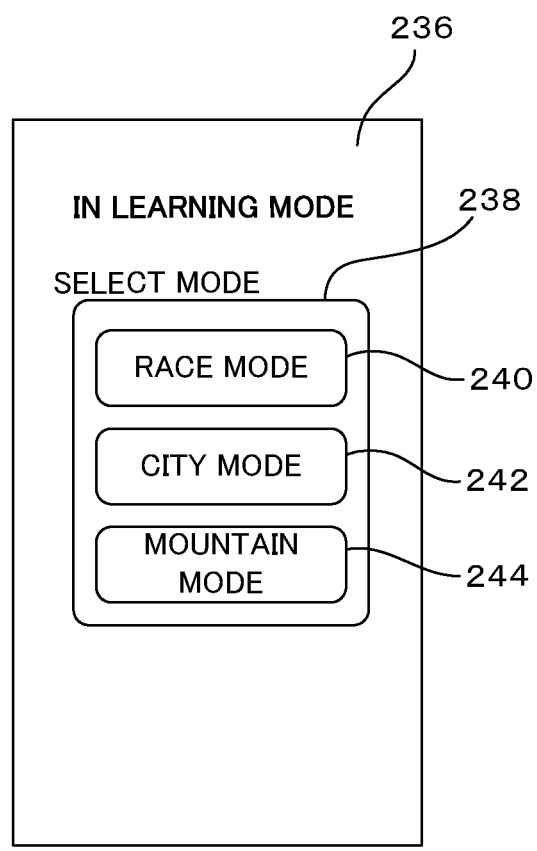
FIG. 16 is an elevational view of the screen of the terminal device showing an example of a screen displayed based on the application program.

FIG. 16 illustrates an example of the details of a learning mode screen 236 displayed when the selection button 232 for the learning mode is selected. On the learning mode screen 236, a mode selection screen 238 is included. The mode selection screen 238 includes a button 240, a button 242 and a button 244 corresponding to modes to be selected. The processor 20 accepts mode selection by the buttons 240-244. The processor 20 accepts mode selection of the mode corresponding to any one of the different learning models 2Ma, 2Mb, . . . by the buttons 240-244.

Figure 17:
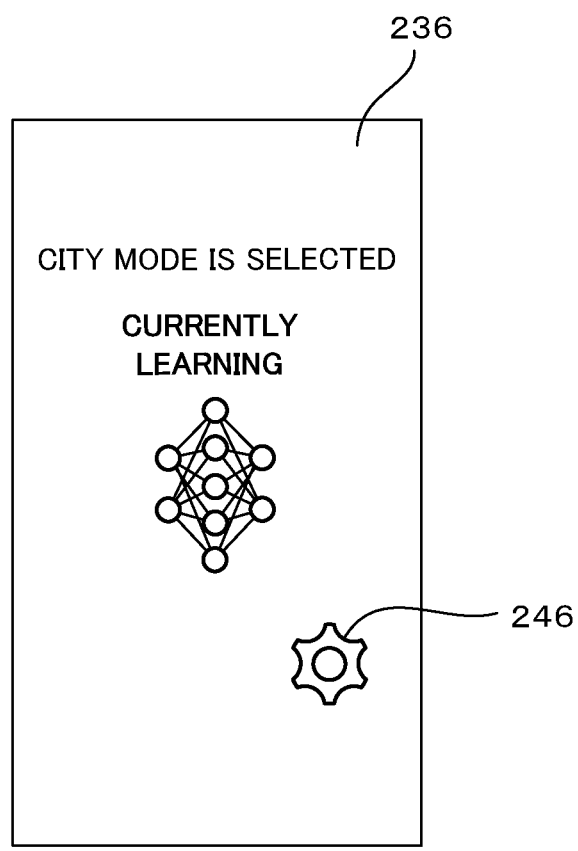
FIG. 17 is an elevational view of the screen of the terminal device showing an example of a screen that is displayed based on the application program.
Figure 18:
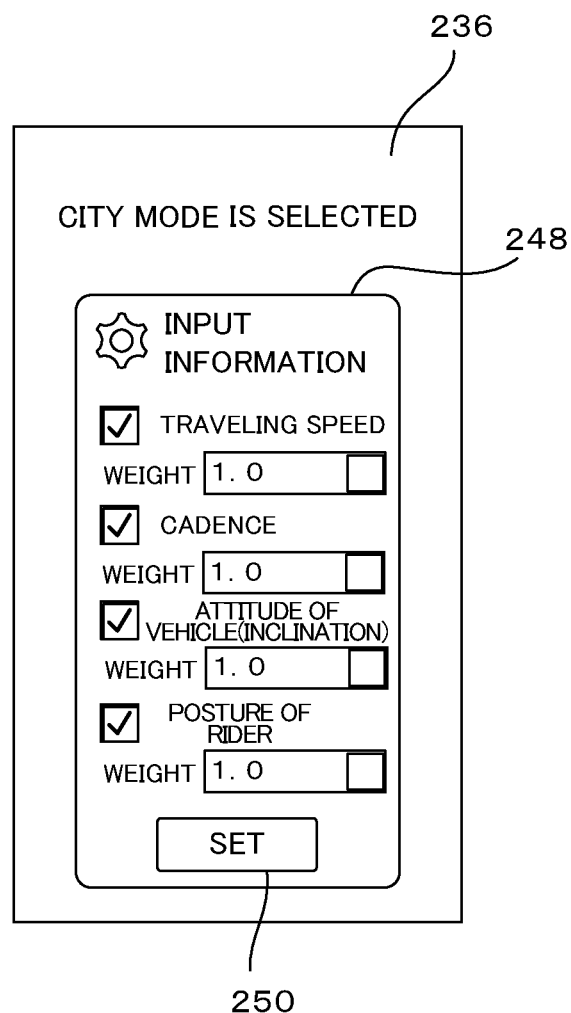
FIG. 18 is an elevational view of the screen of the terminal device showing an example of a screen that is displayed based on the application program.

FIG. 17 illustrates a screen example when any one of the different modes is selected in the learning mode. FIG. 17 illustrates the learning mode screen 236 when the button 242 is selected. After a mode is selected, the processor 20 displays the learning mode screen 236 and executes the training processing. On the screen example in FIG. 17, a message indicating that training is being made is displayed. On the learning mode screen 236, a setting button 246 is included. FIG. 18 illustrates a screen example when the setting button 246 is selected. If the setting button 246 is selected, then the processor 20 displays on the learning mode screen 236 as illustrated in FIG. 18 a setting screen 248 for accepting a combination of pieces of input information associated with one of the learning models 2Ma, 2Mb, . . . corresponding to the mode that is being selected and the setting of weights to be assigned to the respective pieces of the input information. If a setting button 250 on the setting screen 248 illustrated in FIG. 18 is selected, the processor 20 stores the details input or selected by the user operable input device 24 in entry fields within the setting screen 248 into the storage 12 as setting information.

Figure 19:
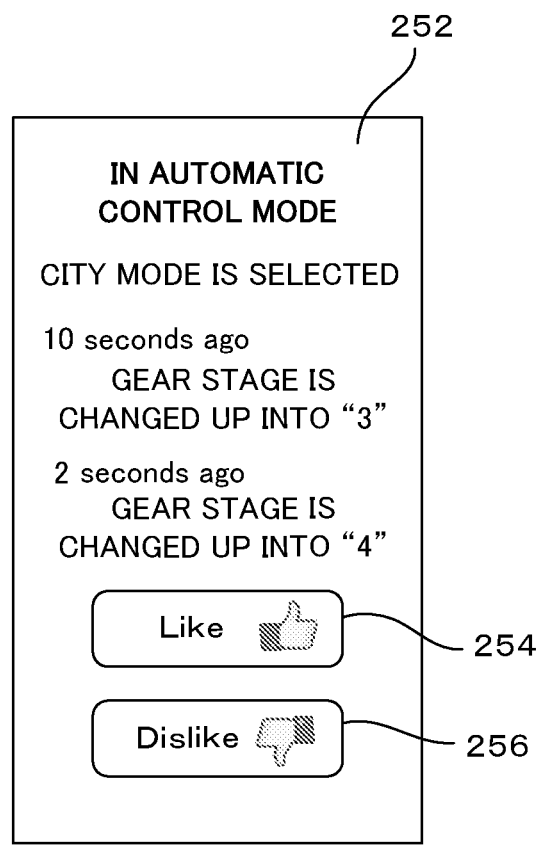
FIG. 19 is an elevational view of the screen of the terminal device showing an example of a screen that is displayed based on the application program.

FIG. 19 is an example of the content of an automatic control mode screen 252 to be displayed if the selection button 234 for the automatic control mode is selected. For the automatic control mode screen 252, if determining that an output of a control signal to the transmission E is necessary and outputting a control signal, the processor 20 displays a message indicating that a gear stage or a gear ratio has been changed, or outputs the message by voice from the voice input-output device 22. The processor 20 accepts an evaluation of this message. The processor 20 accepts the evaluation by the user for the action of each of the components based on the output information output from each of the learning models 2Ma, 2Mb, . . . different for each mode by any example described below.

The first example of the "evaluation acceptance part" includes a high evaluation button 254 and a low evaluation button 256 for accepting an evaluation that are included in the automatic control mode screen 252 illustrated in FIG. 19. The processor 20 recognizes selection operation performed on the evaluation button 254 or 256 via the touch panel of the user operable input device 24 and accepts the evaluation. The high evaluation button 254 in the example illustrated in FIG. 19 is selected if automatic control of the gear stage or the gear ratio is comfortable. The low evaluation button 256 is selected if the automatic control is not comfortable. The processor 20 becomes aware of which one of the buttons 254 and 256 is selected and recognizes the accepted details of the evaluation. As a modification of the first example of the "evaluation acceptance part," only the low evaluation button 256 can be displayed. As a modification of the first example of the "evaluation acceptance part," a button for making such an evaluation that the shifted gear stage or gear ratio is too heavy (too OUTWARD) and a button for making such an evaluation that it is too light (too INWARD) can be included.

The second example of the "evaluation acceptance part" can be a physical button provided on the user operated part D1. A specific evaluation acceptance button can be provided on the user operated part D1. An evaluation acceptance button can separately be provided close to the user operable input device D. The processor 20 can recognize the details of the evaluation based on whether or not the specific evaluation acceptance button is pressed as well as the way of pressing a general-purpose button and a combination with a lever operation. The third example of the "evaluation acceptance part" is a voice recognition part 221 of the voice input-output device 22. The processor 20 accepts an evaluation by recognizing voice of the user via the voice recognition part 221. The processor 20 determines whether or not automatic control is comfortable based on the recognized voice. The fourth example of the "evaluation acceptance part" is the imaging device 25. The processor 20 is a specification part for specifying facial expressions from an image obtained by photographing the face of the user riding the human-powered vehicle A and accepts the evaluation by the user based on the specified facial expressions. The evaluation is obtained by determining whether automatic control is comfortable or not, and a high evaluation is assumed if comfortable.

Figure 20:
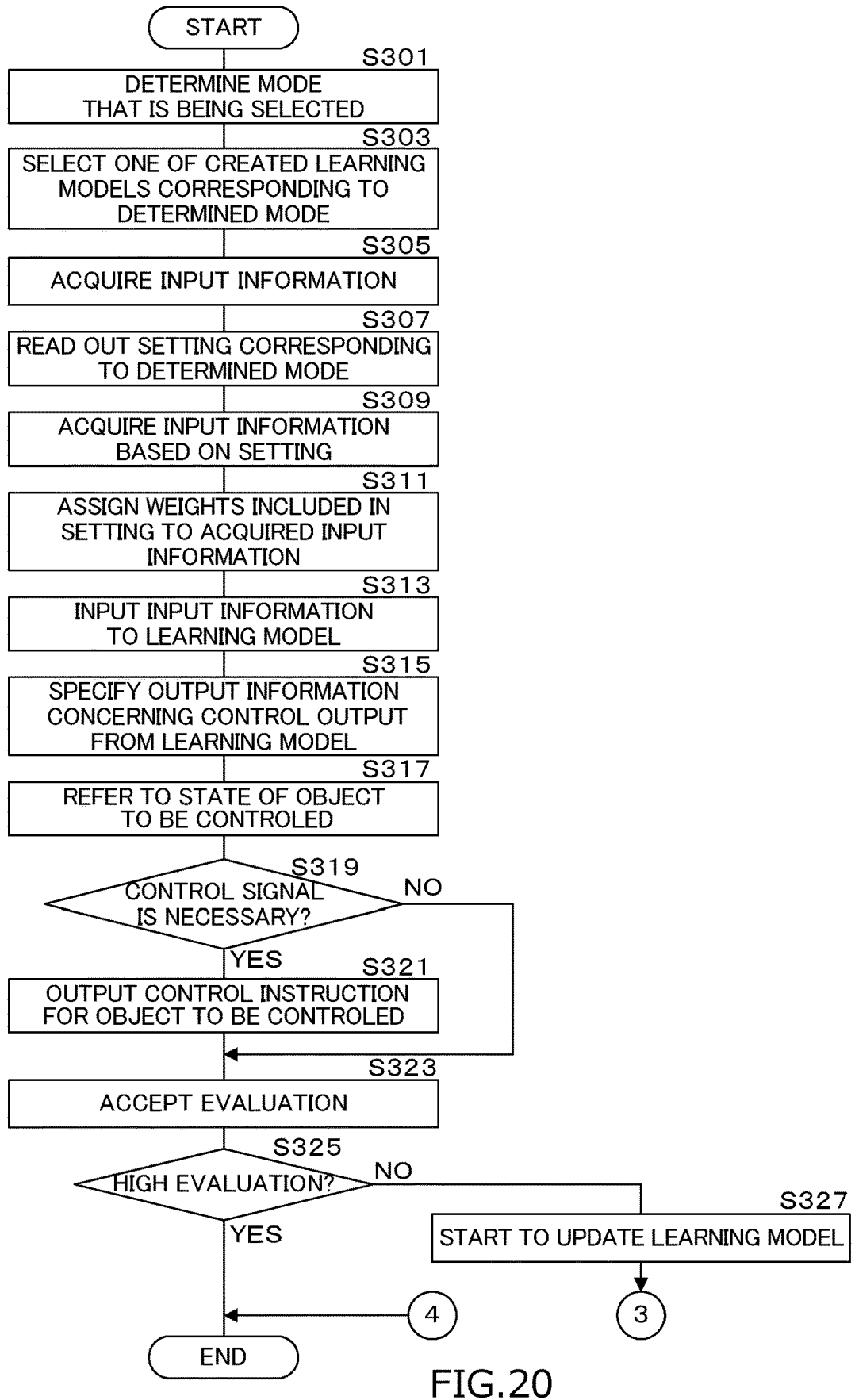
FIG. 20 is a first flowchart part depicting one example of a processing procedure performed by a processor of the controller according to a fourth embodiment.
Figure 21:
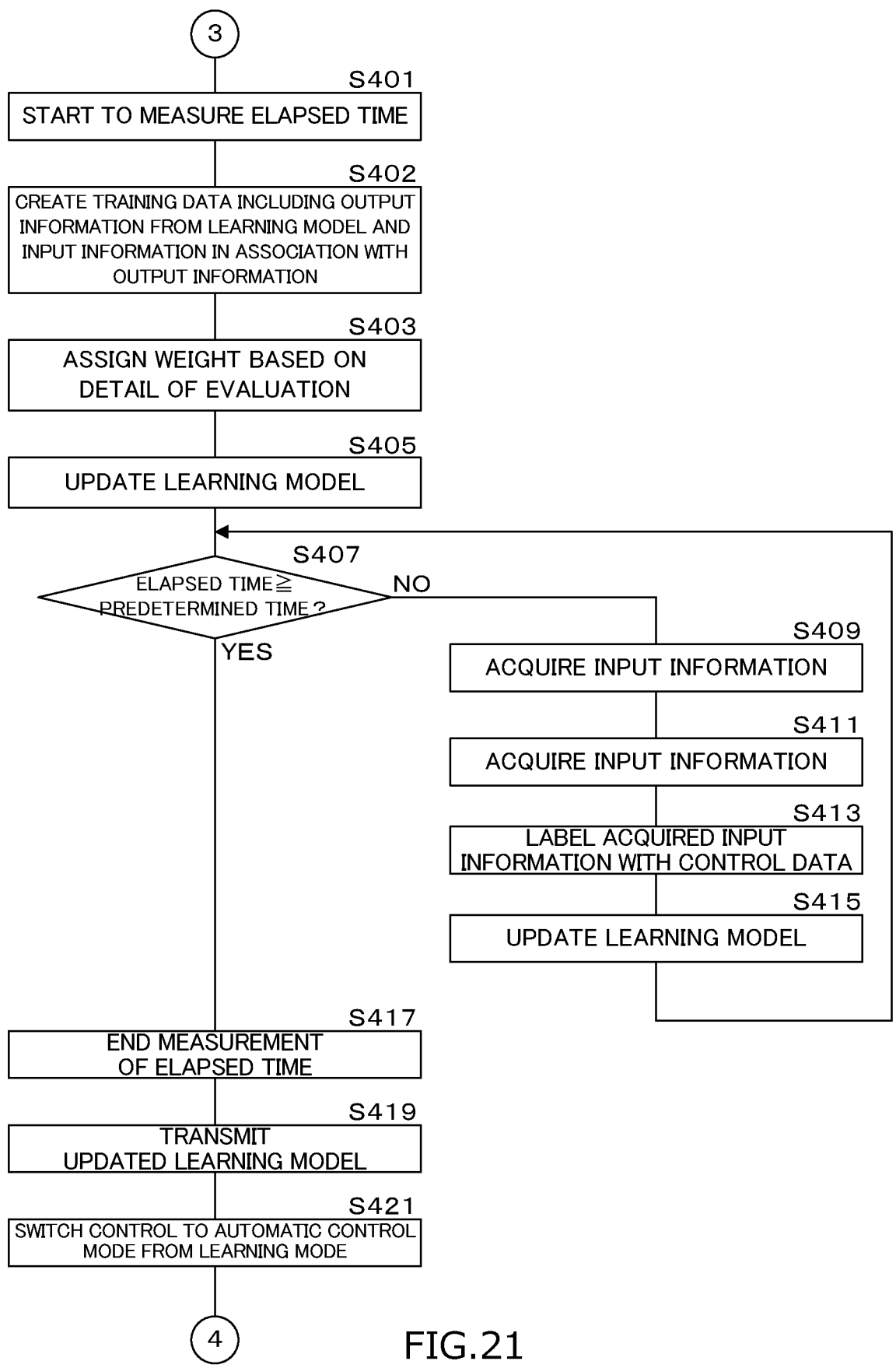
FIG. 21 is a second flowchart part depicting the example of the processing procedure performed by the processor of the controller according to the fourth embodiment.

FIG. 20 and FIG. 21 each are a flowchart depicting one example of the processing procedure performed by the processor 20 in the fourth embodiment. The processor 20 repeatedly executes the following processing procedure when operated in the automatic control mode. It can be executed at a predetermined control period (30 milliseconds, for example).

The processor 20 determines a mode selected out of the different modes on the mode selection screen 238 in FIG. 16 (step S301). The processor 20 accepts selection of any one of the different learning models 2Ma, 2Mb, . . . by the mode selection on the mode selection screen 238 at step S301. The processor 20 selects one of the created learning models 2Ma, 2Mb, . . . corresponding to the determined mode and reads it out from the storage 21 (step S303).

The processor 20 acquires input information concerning traveling of the human-powered vehicle A obtained from the controller 100 through the first communication device 26 (step S305). At step S305, the processor 20 is an "acquisition part" of the "component control device." At step S305, the processor 20 acquires signal levels obtained by the processor 10 of the controller 100 referring to signal levels from the sensor groups S1-S5 and S61-S63 for every control period and temporarily storing them in the internal memory of the processor 10 or the memory integrated in the input-output interface 14.

The processor 20 reads out the setting corresponding to the mode determined at step S301 or the setting corresponding to the one of the learning models 2Ma, 2Mb, . . . selected at step S303 from the setting information stored in the storage 21 (step S307). The processor 20 acquires input information that is associated with the selected one of the learning models 2Ma, 2Mb, . . . based on the setting from the input information acquired at step S305 (step S309). The processor 20 assigns weights included in the setting to the acquired input information (step S311).

The processor 20 inputs the input information that have been selected at step S309 and have been assigned with the weights at step S311 to the one of the learning models 2Ma, 2Mb, . . . that has been read out at step S303 (step S313).

The processor 20 specifies output information concerning control of the component to be controlled that is to be output by inputting the acquired input information to the selected one of the learning models 2Ma, 2Mb, . . . (step S315). The processor 20 specifies a result of discrimination between a gear stage and a gear ratio for the transmission E, for example, as output information at step S315.

The control part of the processor 20 refers to the state of the component to be controlled based on the specified output information (step S317). The processor 20 determines whether or not an output of a control signal is necessary based on the relation between the details of the control indicated by the specified output information and the referred-to state (step S319).

If determining that an output of a control signal is necessary at step S319 (S319: YES), then the processor 20 outputs a control instruction for controlling the component based on the specified output information to the controller 100 (step S321). If determining that an output of a control signal is not necessary at step S319 (S319: NO), then the processor 20 advances the processing to step S323.

The processor 20 accepts an evaluation by the user within a predetermined time period after the processing at step S321 (step S323).

The processor 20 determines whether or not the accepted evaluation is a high evaluation (step S325). If determining that it is a high evaluation (S325: YES), then the processor 20 ends the control processing for one control cycle.

If determining that it is a low evaluation at step S325 (S325: NO), then the processor 20 starts to operate under the learning mode, that is, to update the selected one of the learning models 2Ma, 2Mb, . . . (step S327). The processor 20 can display a message indicating that the learning mode is started on the display 23. At step S325, the processor 20 can start to update the targeted one of the learning models 2Ma, 2Mb, . . . that is being selected if an evaluation is accepted irrespective of whether the accepted evaluation is a high evaluation or not.

The processor 20 starts to measure the elapsed time from the start of the learning mode (step S401). The processor 20 creates training data including the details of the evaluation accepted at step S323, the output information output from the selected one of the learning models 2Ma, 2Mb, . . . selected at step S315 corresponding to the timing when the evaluation from the user is accepted, and the input information in association with the output information acquired at step S305 (step S402). The processor 20 assigns weights based on the details of the evaluation accepted at step S323 to the training data (step S403). The processor 20 updates the selected one of the learning models 2Ma, 2Mb, . . . based on the weighted training data (step S405). At step S405, the processor 20 assigns weights indicating a higher degree of importance to the training data as the evaluation is lower.

The processor 20 determines whether or not the elapsed time started to measure at step S401 is equal to or more than a predetermined time or more (step S407).

If determining that the elapsed time is less than the predetermined time (S407: NO), then the processor 20 acquires input information under the learning mode (step S409) and refers to actual control data based on the user operated part D1 (step S411). The processor 20 labels the input information acquired at step S409 with the referred-to control data to thereby create training data (step S413), then updates the learning models 2Ma, 2Mb, . . . based on the training data of the labeled input information (step S415) and returns the processing to step S407.

If determining that the elapsed time is equal to or more than the predetermined time at step S407 (S407: YES), then the processor 20 ends the measurement of the elapsed time (step S417) and transmits the selected one of the learning models 2Ma, 2Mb, . . . that has been updated to another server device in association with the identification information through the second communication device 27 (step S419). The processor 20 switches the operation to the automatic control mode (step S421) and ends the processing.

The processor 20 can transmit each of the different learning models 2Ma, 2Mb, . . . from the second communication device 27 to another server at a predetermined frequency, such as once a day or once a week, not at the end of the learning mode while the terminal device is detached from the human-powered vehicle A.

In the fourth embodiment, the terminal device 2 can temporarily store, one by one, pieces of input information in time series in the storage 21 in association with actual control data similarly to the second embodiment. In this case, the processor 20 can perform the following processing instead of update using the training data to which weights based on the details of the evaluation are assigned at step S405. The processor 20 sets multiple pieces of input information acquired before and after the timing when the evaluation is accepted by the evaluation acceptance part as an input and updates a selected one of the learning models 2Ma, 2Mb, . . . using the training data including the output information output from the selected one of the learning models 2Ma, 2Mb, . . . and the details of the evaluation accepted by the evaluation acceptance part.

In the fourth embodiment, the terminal device 2 transmits the created different learning models 2Ma, 2Mb, . . . addressed to another server through the second communication device 27. The controller 100 in the first embodiment can contain a communication part like the second communication device 27 and can transmit the created learning model 1M addressed to another server.

In the first to fourth embodiments, as output information output from the learning models 1Ma, 1Mb, . . . or the learning models 2Ma, 2Mb, . . . , control data concerning control of the transmission E is mainly described. The component to be controlled of the human-powered vehicle A can be the electric seat post F or the electric suspension G in place of the transmission E. The components as objects to be controlled of the human-powered vehicle A can be the transmission E, the electric seat post F and the electric suspension G or can be the electric seat post F and the electric suspension G.

What is claimed is:

1. A creation device comprising:
   at least one processor configured to execute operations including:
   an acquisition part configured to acquire input information concerning traveling of a human-powered vehicle; and
   a creation part configured to create different learning models that each produce output information concerning control of a component of the human-powered vehicle based on the input information acquired by the acquisition part.

2. The creation device according to claim 1, wherein the output information includes at least one of a gear stage and a gear ratio for a transmission.

3. The creation device according to claim 1, wherein the input information includes at least one of a traveling speed of the human-powered vehicle and a cadence of a crank of a driving mechanism.

4. The creation device according to claim 1, wherein the input information includes detection data of an attitude of the human-powered vehicle.

5. The creation device according to claim 1, wherein the input information includes detection data of a posture of a user riding the human-powered vehicle.

6. The creation device according to claim 1, wherein the input information includes detection data of a traveling environment of the human-powered vehicle.

7. The creation device according to claim 1, wherein the creation part is configured to input pieces of the input information in a different combination from a combination of information for another one of the learning models out of the pieces of the input information acquired by the acquisition part for each of the different learning models.

8. The creation device according to claim 1, wherein the creation part is configured to set pieces of the input information in a different combination for each of the different learning models.

9. The creation device according to claim 1, wherein the creation part is configured to assign weights different from those of another one of the learning models to a plurality of pieces of data included in the input information acquired by the acquisition part for each of the different learning models and inputs the plurality of pieces of the data that have been weighted.

10. The creation device according to claim 1, wherein the creation part is configured to set different weights for each of the different learning models.

11. The creation device according to claim 1, wherein the acquisition part is configured to acquire pieces of the input information at different points in time, and the creation part is configured to input the pieces of the input information at the different points in time to each of the learning models.

12. The creation device according to claim 11, wherein an interval between the points in time when the pieces of the input information are acquired is different among the different learning models.

13. The creation device according to claim 1, wherein the acquisition part is configured to acquire pieces of the input information at different points in time, and the creation part is configured to input a variation between the pieces of the input information to the learning model.

14. The creation device according to claim 13, wherein a time duration corresponding to the variation between the pieces of the input information is different among the different learning models.

15. The creation device according to claim 1, further comprising
   a selection input that selects a targeted learning model out of the different learning models, wherein
   the creation part creates the targeted learning model selected by the selection input.

16. The creation device according to claim 15, wherein the at least one processor further includes an evaluation part configured to evaluate the output information output from the targeted learning model selected by the selection input, and
   the creation part is configured to update the targeted learning model based on an evaluation by the evaluation part.

17. The creation device according to claim 16, further comprising
   a user operable input device configured to accept a designation operation concerning the output information, and
   the evaluation part being configured to make an evaluation by checking the output information output from the targeted learning model in response to an input of the input information acquired by the acquisition part to the targeted learning model against the designation operation accepted by the user operable input device.

18. The creation device according to claim 17, wherein the evaluation part is configured to provide the output information with a first evaluation concerning the targeted learning model upon determining the output information output from the targeted learning model and a detail of the designation operation do not match with each other.

19. The creation device according to claim 17, wherein the creation part is configured to update the targeted learning model by assigning a weight based on training data including a detail of the designation operation upon determining the output information output from the targeted learning model and the detail of the designation operation do not match with each other.

20. The creation device according to claim 17, further comprising
a non-transitory computer readable storage that temporarily stores, one by one, a plurality of pieces of input information in time series for access by the acquisition part, and
the creation part being configured to set, upon acceptance of the designation operation by the user operable input device, the pieces of the input information acquired before and after a timing when the designation operation is performed as input data, and the creation part being configured to update the targeted learning model using the input data and a detail of the operation by the user operable input device.

21. The creation device according to claim 20, wherein the creation part is configured to update the targeted learning model by increasing a number of acquisitions of the input information upon acceptance of the designation operation by the user operable input device.

22. The creation device according to claim 20, wherein the creation part is configured to update the targeted learning model by increasing an acquisition frequency of input information upon acceptance of the designation operation by the user operable input device.

23. The creation device according to claim 16, further comprising
an evaluation acceptance part configured to accept an evaluation provided by a user for action of the component based on the output information output from each of the different learning models, and
the targeted learning model being updated based on training data including a detail of the evaluation accepted by the evaluation acceptance part, the output information output from the targeted learning model at a timing upon acceptance of the evaluation, and the input information input in association with the output information.

24. The creation device according to claim 23, further comprising
a user operable input device configured to accept a designation operation concerning the output information, and
the evaluation acceptance part being provided at the user operable input device or near the user operable input device so as to accept evaluation operation by the user.

25. The creation device according to claim 23, wherein the evaluation acceptance part includes a specification part that specifies facial expressions from a photographed image obtained by photographing a face of the user who is riding the human-powered vehicle, and that accepts an evaluation made by the user based on the facial expressions specified by the specification part.

26. The creation device according to claim 23, wherein the evaluation acceptance part includes a voice recognition part, and accepts an evaluation by recognizing a voice of the user.

27. The creation device according to claim 1, further comprising:
a model selection input configured to accept a selection of any one of the different learning models that have been created; and
a transmission device configured to transmit the one of the learning models selected by the model selection input.

28. A component control device comprising:
a model selection input configured to accept a selection of any one of different learning models that have been created;
a non-transitory computer readable storage having a learning algorithm stored in the non-transitory computer readable storage; and
at least one processor operatively coupled to the non-transitory computer readable storage to execute operations including:
an acquisition part configured to acquire input information concerning traveling of a human-powered vehicle,
a creation part configured to use the learning algorithm to create different learning models for outputting output information concerning control of a component of the human-powered vehicle based on the input information concerning traveling of the human-powered vehicle, and
a control part configured to control the component based on the output information output from a selected one of the different learning models by inputting the input information acquired by the acquisition part to the selected one of the learning models.

29. The component control device according to claim 28, wherein
the acquisition part is configured to acquire the input information that is brought into correspondence with the selected one of the learning models selected by the model selection input and inputs the input information.

30. The component control device according to claim 29, wherein
the output information includes at least one of a gear stage and a gear ratio for a transmission.

* * * * *